United States Patent
Greenberg

(10) Patent No.: US 11,131,861 B2
(45) Date of Patent: Sep. 28, 2021

(54) IMAGE PROJECTION SYSTEM

(71) Applicant: EYEWAY VISION LTD, Or Yehuda (IL)

(72) Inventor: Boris Greenberg, Tel Aviv (IL)

(73) Assignee: EYEWAY VISION LTD

( * ) Notice: Subject to any disclaimer, the term of this patent is extended or adjusted under 35 U.S.C. 154(b) by 70 days.

(21) Appl. No.: 16/615,716

(22) PCT Filed: May 29, 2017

(86) PCT No.: PCT/IL2017/050601
§ 371 (c)(1),
(2) Date: Nov. 21, 2019

(87) PCT Pub. No.: WO2018/220608
PCT Pub. Date: Dec. 6, 2018

(65) Prior Publication Data
US 2020/0174263 A1 Jun. 4, 2020

(51) Int. Cl.
G02B 27/14 (2006.01)
G02B 27/10 (2006.01)
G02B 27/09 (2006.01)

(52) U.S. Cl.
CPC ....... *G02B 27/106* (2013.01); *G02B 27/0955* (2013.01); *G02B 27/14* (2013.01)

(58) Field of Classification Search
CPC ... G02B 27/106; G02B 27/0955; G02B 27/14
(Continued)

(56) References Cited

U.S. PATENT DOCUMENTS 5,615,683 A 4/1997 Toge et al.
5,886,723 A 3/1999 Kubelik et al.
(Continued)

FOREIGN PATENT DOCUMENTS

CN 1930509 A 3/2007
CN 103837985 A 6/2014
(Continued)

OTHER PUBLICATIONS

International Search Report from International Application No. PCT/IL2017/050601 dated Nov. 16, 2017.

*Primary Examiner* — William Choi
(74) *Attorney, Agent, or Firm* — Dorsey & Whitney LLP

(57) ABSTRACT

A system and method for retinal image projection are disclosed. The system includes an image projection module that is configured and operable for projecting at least first and second image portions corresponding respectively to first and second parts of an image to be respectively projected on foveal and peripheral regions of an eye retina; and an optical multiplexing module optically coupled to the image projection module and configured and operable to spatially and/or temporally combine/multiplex the projections of the at least first and second image portions for generating a combined image projection output for propagation along a general common optical path which is to be directed towards said eye retina. The optical multiplexing module is configured and operable to multiplex the projections the first and second image portions such that a lateral extent of the combined projection is somewhat similar to a lateral extent of the second image portion in the combined projection which is intended to fall/cover the parafoveal regions of the eye retina, and the lateral extent of the first image portion in the combined projection being smaller and within the lateral extent of the combined projection. The first and second image portions may be projected with different qualities (different resolutions and/or different color depth) and/or with different framerates in accordance with the respective foveal and parafoveally regions of the retina to which there are intended, to the by optimize the image quality/frame rate, and the associated processing and projection capabilities to the anatomical structure of the retina.

16 Claims, 10 Drawing Sheets

(58) Field of Classification Search
USPC .......................................... 359/630; 345/7–9
See application file for complete search history.

(56) References Cited

U.S. PATENT DOCUMENTS

| | | |
|---|---|---|
| 5,886,823 A | 3/1999 | Sugano |
| 7,439,940 B1 | 10/2008 | Maguire |
| 8,382,285 B2 | 2/2013 | Eberl et al. |
| 8,922,898 B2 | 12/2014 | Legerton et al. |
| 2001/0043163 A1 | 11/2001 | Waldern et al. |
| 2002/0109819 A1 | 8/2002 | Tuval |
| 2005/0185281 A1 | 8/2005 | Perlin et al. |
| 2006/0072209 A1 | 4/2006 | Karasawa et al. |
| 2006/0072215 A1 | 4/2006 | Nishi |
| 2007/0285793 A1 | 12/2007 | Liu et al. |
| 2008/0002262 A1 | 1/2008 | Chirieleison |
| 2009/0189830 A1 | 7/2009 | Deering et al. |
| 2010/0149073 A1 | 6/2010 | Chaum et al. |
| 2012/0105310 A1 | 5/2012 | Sverdrup et al. |
| 2012/0257282 A1 | 10/2012 | Hudman |
| 2014/0139404 A1 | 5/2014 | Takeda et al. |
| 2014/0177017 A1 | 6/2014 | Kubota et al. |
| 2015/0049004 A1 | 2/2015 | Deering et al. |
| 2015/0178939 A1 | 6/2015 | Bradski et al. |
| 2015/0238362 A1 | 8/2015 | Chayet et al. |
| 2015/0277123 A1 | 10/2015 | Chaum et al. |
| 2016/0143527 A1 | 5/2016 | Macdougall |
| 2016/0240013 A1 | 8/2016 | Spitzer |
| 2016/0274365 A1 | 9/2016 | Bailey et al. |
| 2016/0377865 A1 | 12/2016 | Alexander et al. |

FOREIGN PATENT DOCUMENTS

| | | |
|---|---|---|
| CN | 104145207 A | 11/2014 |
| CN | 105264423 A | 1/2016 |
| EP | 3384337 A1 | 10/2018 |
| EP | 3610318 A1 | 2/2020 |
| IL | 242895 | 4/2016 |
| JP | H07-077665 | 3/1995 |
| JP | H09304728 A | 11/1997 |
| JP | H1184306 A | 3/1999 |
| TW | 201537218 A | 10/2015 |
| WO | 2004029693 A1 | 4/2004 |
| WO | 2014013702 A1 | 1/2014 |
| WO | 2014192479 A1 | 12/2014 |
| WO | 2015132775 A1 | 9/2015 |
| WO | 2017037708 A1 | 3/2017 |

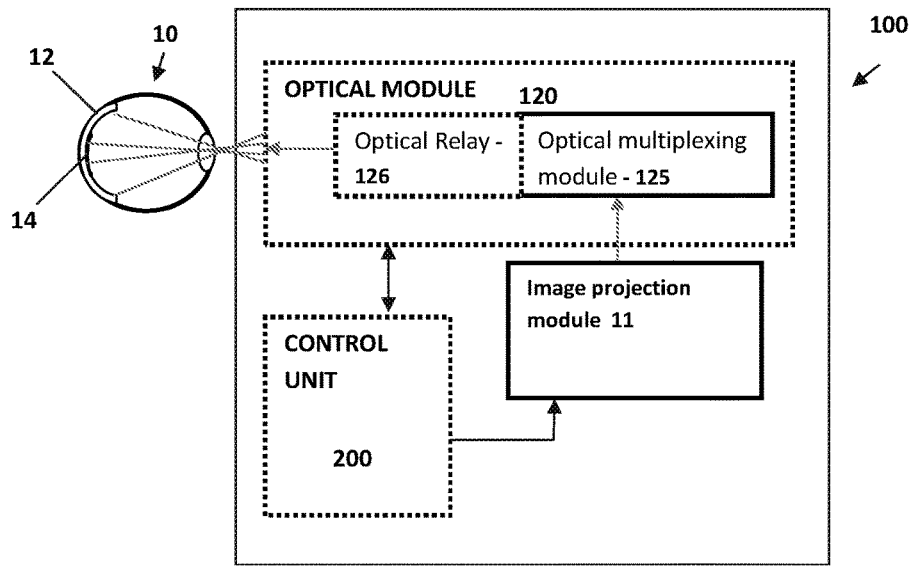

251 → Receiving imagery data, which is indicative of a content and layout of image(s) that should be projected to the user's eye.

252 → Processing the imagery data to determine/produce a "projection image frame" indicative of the image content that should be projected on the retina 253 → Registering (e.g. aligning and/or scaling) the "projection image frame" relative to the optical axis (LOS) of the eye 254 → Segmenting the "projection image frame" into two or more image portions, to be projected on a central and periphery regions of the retina.

255 → Rendering the image portions in accordance with the projection properties of the first and second image projection units.

FIG. 1B

IMAGE PROJECTION SYSTEM

TECHNOLOGICAL FIELD

The present invention is in the field of image projections systems and is particularly related to wearable/head mounted retinal projection systems for providing a pure, augmented or virtual reality experience to users.

BACKGROUND

Head mounted or generally wearable image projection systems are used for providing virtual and/or augmented reality experience by displaying images directly into users' eyes. Various types of head mounted projection systems are known utilizing image projection in front of or into the eyes of a user. Such projection systems are in many cases configured as glasses mountable onto a user's head and operable for projecting images onto the user's eyes for providing true and convincing display.

Similar to standard display systems, head mounted display systems aim to provide high resolution images while utilizing limited computational power. To simplify image rendering complexity, certain retinal/foveal display systems have been developed, utilizing separate image projections for the foveal region of the user's eye, and an additional, lower resolution image projection directed to the peripheral regions of the retina to provide a wide field of view.

US2008002262 discloses a head mounted display device which has a mount which attaches the device to a user's head, a beam-splitter attached to the mount with movement devices, an image projector which projects images onto the beam-splitter, an eye-tracker which tracks a user's eye's gaze, and one or more processors. The device uses the eye tracker and movement devices, along with an optional head-tracker, to move the beam-splitter about the center of the eye's rotation, keeping the beam-splitter in the eye's direct line-of-sight. The user simultaneously views the image and the environment behind the image. A second beam-splitter, eye-tracker, and projector can be used on the user's other eye to create a stereoptic, virtual environment. The display can correspond to the revolving ability of the human eye. The invention presets a high-resolution image wherever the user looks.

US 2012/0105310 describes a head mounted display system with at least one retinal display unit having a curved reflector positioned in front of one eye or both eyes of a wearer. The unit includes a first set of three modulated visible-light lasers co-aligned and adapted to provide a laser beam with selectable color and a first scanner unit providing both horizontal and vertical scanning of the laser beam across a portion of the curved reflector in directions so as to produce a reflection of the color laser beam through the pupil of the eye onto a portion of the retina large enough to encompass the fovea. The unit also includes a second set of three modulated visible-light lasers plus an infrared laser, all lasers being co-aligned and adapted to provide a color and infrared peripheral view laser beam, and a second scanner unit providing both horizontal and vertical scanning of the visible light and infrared laser beams across a portion of the curved reflector in directions so as to produce a reflection of the scanned color and infrared laser beams through the pupil of the eye onto a portion of retina corresponding to a field of view of at least 30 degrees×30 degrees.

US 2005/185281 describes an apparatus for viewing which includes a screen. The apparatus includes means for detecting a fixation point of a viewer's eyes on an image on the screen. The apparatus includes means for displaying a foveal inset image of the image on the screen about the fixation point so a viewer's fovea sees the foveal image while the rest of the eye sees the image. The method includes the steps of detecting a fixation point of a viewer's eyes on an image on a screen. There is the step of displaying a foveal inset image of the image on the screen about the fixation point so the viewer's fovea sees the foveal image while the rest of the eye sees the image.

US 2009/189830 describes a display device which is mounted on and/or inside the eye. The eye mounted display contains multiple sub-displays, each of which projects light to different retinal positions within a portion of the retina corresponding to the sub-display. The projected light propagates through the pupil but does not fill the entire pupil. In this way, multiple sub-displays can project their light onto the relevant portion of the retina. Moving from the pupil to the cornea, the projection of the pupil onto the cornea will be referred to as the corneal aperture. The projected light propagates through less than the full corneal aperture. The sub-displays use spatial multiplexing at the corneal surface.

GENERAL DESCRIPTION

There is a need in the art for a novel configuration of a display system providing retinal image projection having desirably high image/projection quality with given image rendering power.

In conventional projection systems the maximal image resolution is generally limited by several factors: image generating element (projecting unit), processing power provided by the control unit, e.g. graphic processing unit (GPU), and bandwidth of data transmission from the GPU to the projecting unit(s). Thus, providing image projection, having pixel density equivalent to spatial resolution of human vision utilizing conventional eye projection systems, requires both extremely high computing power and may typically require an array of small projecting/display units.

More specifically, providing imaging with maximal human eye resolution may typically require projection of image frames containing about 20 megapixels or more for each eye. Additionally, to provide temporal resolution matching to that of human perception (so that image movements are perceived as smooth and seamless), the displayed images may need to be rendered at rates of 60 HZ or more. This requires high rates of image rendering and of data transfer between the control unit and the projecting unit(s), and between a storage utility and the control unit (e.g. in the order of 28 GBit/second considering projection of images with color depth of 24 bit color). Such high data transfer rates are generally beyond the capabilities of state of the art eye projection devices, and in any case, might increase the systems' weight, size, cost and energy consumption.

The present invention provides a novel image projection system which utilizes one or more image projection modules/units to project image(s) with spatially varying image projection quality onto the retina. In this regard, the phrase image projection quality is used herein to refer to the pixel density (e.g. DPI or dots per unit solid angle) of the image projection onto the retina, and possibly also onto the color depth level in the projected image. To this end, in some embodiments the two or more projection modules provide image portions having respectively two or more levels of color depth.

In certain embodiments, the technique of the present invention utilizes projection of high pixel density image portions, i.e. having high angular resolution and equivalently high number of dots per inch (DPI) on the projected surface, onto the fovea region of a user's eye and projection of image portions with lower pixel density (lower angular-resolution/DPI) onto the periphery of the user's retina (e.g. the parafoveal region). This provides effective high resolution perception of the projected image by the user's eye, while reducing image rendering, data transmission and storage needs of the projection system. Thus, high pixel density image(s) are provided to retina regions (fovea) which are capable of collecting the image details and translating them to the user's brain, while image(s) of lower pixel density (angular resolution) are provided to regions (parafovea) of the retina having lower perception abilities.

Similarly, certain embodiments of the present invention take advantage of the fact that the perception of color depth is much more eminent in the foveal region of the eye retina, than in other (parafoveal) regions. In those embodiments, image portions that are projected on the fovea, are projected with higher color depth than image portions that are projected on the periphery.

Thus, according to certain embodiments of the present invention, certain portions of the image are projected with high image projection quality (high angular resolution and/or high color depth) on certain regions of the retina (i.e. on the fovea) that are capable of perceiving projected images with high DPI and/or with high color depth, and certain other portions of the image are projected with lower image projection quality on regions of the retina, where perception is limited to lower DPIs and/or to lower color depth (e.g. peripheral/parafoveal regions of the retina).

Accordingly, some embodiments of the present invention utilize one or more image projection modules (e.g. including a single image projection unit or two image projection units) and an optical imaging multiplexing module to project on the retina, images which are composed of image portions having different, respectively wide and narrow, angular spread. The image portion, with the narrow angular spread (i.e. herein after referred to also a the first image portion; e.g. covering solid angle of 3° to 10° along each of the horizontal and the vertical axes) has higher image projection quality (higher angular-resolution/DPI and/or higher color depth) and is projected on the central (fovea) region of the retina so that the user can perceive high quality images. The image portion with wide angular spread (i.e. herein after also referred to as the second image portion; e.g. covering solid angle of between 60° and 170° along each of the horizontal and vertical axes may have lower image projection quality (although possibly higher frame rate) and is projected on the periphery of the retina (e.g. the so called parafoveal area). This allows to exploit the anatomical properties of the human eye, to project an image with perceived high quality thereto, while reducing the amount of data and processing requirements, and/or the size/weight and/or cost of the system, which would have been required in cases where the image would have been projected with the same high quality uniformly across the retina.

Accordingly, the technique of the present invention dramatically reduces data transfer and processing requirement of the eye projection system, while maximizing user experience from the projection system (the user still perceives high resolution images through regions of the retina capable of doing so).

As is known, the retina's inner coating of the human eye has light sensitive tissue. A region of the retina called the fovea is responsible for sharp vision, having a high density of cone-type photosensitive nerve cells. To this end, the technique of the present invention utilizes high resolution images directed at the user's fovea while providing peripheral images directed at the retina and having lower image resolution to reduce rendering complexity while maintaining a large field of view. Therefore, the technique of the invention focuses image projection with high resolution at the fovea, and provides projection with lower resolution, thus providing high resolution projection with reduced processing and data transmission requirement as compared to uniform pixel density rendering.

The eye projection system of the present invention includes an optical module configured to direct images (i.e. also referred to herein as image portions) from at least two (e.g. first and second) image projecting units into the user's eye (i.e. at least into one eye). The optical module is configured to multiplex the first and second image portions (spatially and/or temporally combine them) and direct the first image portion provided from the image projection module into a first region of the user's eye (fovea), and direct the second image portion to surrounding/peripheral regions of the retina (parafovea).

According to some embodiments, the optical module may generally comprise an optical multiplexing module (e.g. temporal and/or spatial optical multiplexer also interchangeably referred to herein as combining unit, and typically including spatial and/or temporal beam combiner), and a relay unit (also referred to herein as optical relay), which may be arranged in cascading order along an optical path of the optical module to direct image projections from the image projection units and project them in combination (simultaneously or not) into the user's eye. More specifically, the combining/multiplexing unit combines light beams associated with the projected image portions generated by the at least first and second projection units into a combined optical field (also referred to herein as combined image projection) representing the full projection image frame(s) that propagates along a common general optical path to be directed/projected to the user's eye. Here the phrase optical field and combined optical field are used to designate the intensity profile and possibly the chromatic content of light measured across the optical path of image projection towards the eye. The light beams forming the combined optical field may be transmitted from the combining unit to the optical relay, which directs the optical field to the user's eye.

It should be understood that the terms optical relay (i.e. relay unit) used herein refers to an imaging type optical relay module which can receive an image projection at one input port thereof and relay the image projection to an output port of the relay located a certain distance from the input port, while possibly applying certain optical magnification of the relayed image projection. Indeed, typically the optical relay module may not have any net optical power (its focal length may be infinite) and does not affect the focusing properties of the image projection (beams thereof) which are relayed therethrough. None-the-less, in some implementations, some relays may be configured with certain optical power (namely with finite focal length).

The optical relay generally includes at least two groups of lenses—referred to herein as lens-sets arranged with a certain distance between them along the optical path of the optical relay. At least one (first/entrance) lens-set defines the entrance port of the optical relay, and at least one other (second/exit) lens-set defines the exit port of the optical relay. In this regard, it should be understood that the term lens-set is used herein to designate a set/group of one or more lenses, which may include: one or more refractive lenses (which focal power is obtained via refraction), diffractive lenses (which focal power is obtained via diffraction), mirror lenses (which focal power is obtained via reflection from a curved surface) and/or a combination thereof. The lens-set be it one, or more lenses has a certain optical power (a certain finite focal length) and is associated with a certain principal optical plane defining its optical location along the optical path (e.g. defining the equivalent location of a "thin lens" having the same optical/focal properties of the lens-set). In some embodiments, the magnification properties of an optical relay are associated with the ratio of between the focal lengths of the first/entrance lens-set and the second/exit lens-set (e.g. unless additional optical power elements are located in the optical path between them). For optical relays having no net focal power, the distance between the first/entrance lens-set and the second/exit lens-set (the distance between their principal optical planes) should equal the sum of their focal lengths provided there are no additional focusing optical elements (additional optical power elements) between them.

More specifically, in some embodiments, the optical relay is configured to relay to the optical field such that it is directly projected on the retina. Examples of configurations and methods of operation of such optical modules including such relays which are configured and operable for direct projection of images onto the eye retina, and which may be incorporated in the optical module of the present invention, are described for example in PCT patent publication No. WO 2015/132775 and in IL patent application No. 241033, both co-assigned to the assignee of the present patent application and incorporated herein by reference.

In this connection, it should be understood that the term direct projection as used hereinbelow relates to projection of an optical field (e.g. image) such that the propagating optical field is focused to an image plane on the user's retina. For instance, the optical module and/or the optical relay thereof may be configured such that the light beams of the optical field arrive at the eye lens such that they are substantially collimated and/or so that they are focused on the retina by the eye lens itself. Alternatively or additionally, such direct projection may be achieved by projecting the light field towards the retina such that its cross-section diameter is substantially (e.g. twice or more) smaller than the entrance pupil of the eye (to thereby obtain high depth of field of the image projection on the retina).

In some embodiments the optical module includes or is associated with a trajectory module (e.g. moveable or rotatable light deflector(s) for instance presenting a gaze tracking optical deflector and/or pupil position optical deflector such as those described in IL patent application No. 241033), which is configured and operable for adjusting the optical path of the image projection in accordance with line of sight (LOS) of the user's eye and/or in accordance with the relative lateral position of the eye/pupil with respect the eye projection system of the present invention. To this end the system may utilize, and/or may include, an eye tracking unit configured to detect the LOS of the user's eye and/or variation in gaze direction, and provide corresponding data to the trajectory module to vary orientation of the general optical path to determine deflection of optical path provided by the trajectory module. Accordingly, the image(s) (optical field) may be projected by the system along the general optical path that changes in accordance with changes in the orientation of the line of sight (LOS) of the eye, and/or changes in the pupil's/eye's position relative to the eye projection system. To this end, the trajectory module may be configured to vary the general optical path of light propagation along the optical module in accordance with orientation of the user's eye relative to the eye projection system (e.g. in accordance with the direction of the optical-axis/line-of-sight (LOS) of the eye). Examples of such an optical system including an optical relay, and eye tracking optical deflectors (e.g. pupil position beam deflector and gaze direction beam deflector), which can be used to direct image projection to the eye retina while the eye's position and its gaze direction may vary with respect to the eye projection system, are described for instance in IL patent application No. 241033 which is co-assigned to the assignee of the present patent application and incorporated herein by reference.

To this end, with the use of the trajectory module, eye tracking unit and the optical relay unit, the optical path of the optical module can be varied such that the optical field combined with the two or more image portions, may be transmitted along the general optical path towards the user's pupil. The projected light field can be directed to arrive at the pupil's location from a variety of angular orientations, such that the user's eye may form the combined image on the proper location on the retina, while the user may change his gaze direction and/or while the relative displacement between the eye projection system and the eye changes. As described above, the optical field is configured such that the first image portions forms a portion of the image on a selected part of the retina (i.e. the fovea) and the second image portions form portion(s) of the image on other regions of the retina (parafoveal). Further, the location of the generated image portion(s) on the retina may be kept fixed, even if the user shifts his gaze direction or slightly moves the system relative to the eye.

It should be noted that in some embodiments the system of the invention includes a single image projection unit operable for generation and projecting a temporal sequence of the first and second image portions (foveal and parafoveal portions). Alternatively or additionally, in some embodiments the system of the invention includes at least two, first and second, image projection units which respectively generate and project the first and second image portions. In the latter case, the first and second image projection units may generally have different properties. For instance, in order to project the different fields of view, the image projection units may be configured and operable for outputting towards the optical modules light rays/beams spanning different angular extents. Also they may be configured to output images with different angular resolutions and/or different color depth. For instance the first image projection unit may be adapted to provide RGB images (image portions) with high angular resolution and high color depth, and the second image projection unit may be adapted to provide RGB image portions with lower color depth, or in some case monochromatic, and/or image portions with lower angular resolution. Variation in color depth may be such that the first projection unit provides image with color depth of e.g. 32 bit or 24 bit and the one or more second projection units provide images with color depth of e.g. 16 bit or 8 bit.

In some cases image projection unit(s) may be configured as scanning image projection whose outputted image is produced by scanning (e.g. rastering) light rays over the angular extent through which the image is outputted while modulating the intensity and possibly the color content of the light rays to create and project an optical field encoding an image (image portion).

In some cases where the first and second image projection units are used, the first and second image projection units may be configured based on different technologies. For instance, the first image projection unit may be configured as a scanning image projection for producing the first (foveal) image portions by scanning (e.g. rastering) the light rays over a desired angular extent while modulating their intensity and/or color content to. Using scanning based image projection may be advantageous in terms of power and intensity over non scanning based (e.g. SLM based) projection units. The second image projection unit may be configured as either a scanning image projection system as described above, or as an area image projection system utilizing one or more spatial light modulators (SLMs; such liquid crystal array and/or micro-mirror array) to simultaneously modulate the intensities and possible chromatic content of the plurality of pixels projected thereby. Examples of configurations and operations of image projection units using raster scanning and/or spatial light modulation to form images are generally known in the art of image projection, and the principles of their configurations and operations need not be described herein in detail.

It should be noted that according to the present invention the image projection module (including the single and/or the first and second image projection units) is configured and operable for respectively outputting two, first and second, complementary image portions (optical fields) which spatially complement one another to form projection of a continuous image on the surface of the retina. To this end, the optical module may be adapted to project/adjust the projection of the first image portions for covering a certain angular/lateral extent about the general optical axis of the optical module such that when it is directed to the retina it falls on the foveal region thereof. The optical module may also be adapted to project/adjust the projection of the second image portion to cover a wider angular/lateral field extending about the general optical axis, while optionally spanning/covering an annular (or more generally frame or donut like region) about the general optical axis of the optical module, so that when the second image portion is directed to the retina, it falls at least on the periphery of the retina.

In this regard the image projection module and/or the optical module is/are adapted to produce (generate and/or optically manipulate) the projections of the is first and second image portions such that they spatially complement one another (e.g. such that they overlap or have a common boundary) to enable the optical module to appropriately spatially and/or temporally combine the resulting optical fields (image portions) to form a combined image projection (combined optical field). The resulting combined optical field corresponds to the foveal image portion at a central region (at an image plane) thereof and parafoveal image portion at a peripheral portion thereof (at an image plane), providing together a spatially continuous image.

In some implementations the first and second image portions are projected with some overlap in the boundary between them so that combined optical field provides substantially smooth transition between the image portions. To achieve this, image projection module may be adapted for projecting the second image portions (e.g. annular optical field) such that their lateral/angular extent can be combined to spatially overlaps the first (e.g. central) image portion (optical field) while the image contents of the first and second image portions at the overlapping boundary may be similar (although possibly with different qualities. To this end, some overlap between the first and second image portions, at least along the periphery (annular boundary) of the first image portion may be used to provide smooth and seamless transition between the high quality of the first image portion and the lower quality of the second image portion.

This technique of the present invention reduces rendering processes by directing the required computing power to generate high resolution images for the center field of view corresponding to the regions on which the user is fixating. The periphery of the image and of the user's field of view may be rendered and projected at lower resolution. This is since the parafoveal part of the projected image is at the periphery of the user's attention and is captured by the parafoveal region (herein referred to as the retina in general) of the user's eye where the photoreceptor cells are of lower density and provide data with reduced spatial density and lower resolution.

It should be noted that as the images directed into the user's eye are generally rendered in accordance with the orientation of the eye, and transmission of the image/light field is adjusted by the eye tracking unit, the user can experience complete virtual reality (or augmented reality) perceiving a large field of view (with effectively no image boundaries) providing a sense of presence to the user.

Thus, according to one broad aspect of the present invention there is provided a system for use in retinal image projection. The system includes an image projection module adapted for projecting at least first and second image portions corresponding respectively to first and second parts of an image to be respectively projected on foveal and peripheral regions of an eye retina. The system also includes an optical multiplexing module optically coupled to the image projection module and configured and operable to combine projections of the at least first and second image portions for generating a combined projection for propagation along a general common optical path which is to be directed towards said eye retina. The optical multiplexing module is configured and operable to combine the projections of the first and second image portions in at least one of spatial and temporal multiplexing such that with a lateral extent of the combined projection is similar to a lateral extent of the second image portion in the combined projection, and the lateral extent of the first image portion in the combined projection being smaller and within the lateral extent of the combined projection. Accordingly upon directing the combined projection towards the eye retina, the projection of the first image portion covers a foveal region of the retina and the projection of the second image portion covers at least a peripheral region of the retina.

According to some embodiments the system is configured such that the first and second image portions have respectively higher and lower spatial pixel densities in the combined projection thereby optimizing said combined projection to correspond respectively to higher and lower spatial resolutions of foveal and peripheral regions of the retina respectively.

According to some embodiments the system is configured such the first and second image portions are respectively projected with lower and higher frame rates in the combined projection. This thereby optimizes the combined projection such that it corresponds to the respectively lower and higher temporal resolutions of foveal and peripheral regions of the retina.

According to some embodiments the image projection module includes at least first and second image projection units. The first and second image projection units are configured and operable for spatially separated projection of the at least first and second image portions. The optical multiplexing module is configured and operable to spatially combine the at least first and second image portions such that the first image portion, projected by the first image projection unit, is at a central region of the combined projection, and the second image portion, projected by the second image projection unit, extends laterally over an annular region enclosing the central region of the combined projection.

In some embodiments the second image projection unit is configured to project the second image portion with an angular extent larger than an angular extent of the first image portion projected by the first image projection unit.

In some embodiments the optical multiplexing module includes a beam combiner configured and operable to receive the (spatially separated) projections of the first and second image portions, which have respectively smaller and larger angular extents, and combining them to output the combined (image) projection.

According to some embodiments the beam combiner includes a wedge deflector (e.g. wedge type—beam combiner/one-way reflective wedge surface). The wedge deflector is configured with its front and back surfaces tilted with respect to one another with tilt angle selected such that projected light from one of the first and second image projection units is being reflected from one of the surfaces of the wedge deflector to propagate along the optical path while being reflected from another one of the surfaces of the wedge deflector towards a direction outside the optical path. This configuration of the beam combiner provides for suppressing/preventing ghost reflections from propagating along the optical path.

According to various implementations of the system the optical multiplexing module includes an optical relay module arranged downstream from the beam combiner (hereinafter the term downstream should be interpreted as the along the light propagation direction from image projection module through the optical path of the system, and upstream should be understood as the opposite direction). The optical relay is configured and operable for relaying the combined projection towards an optical output of the system.

According to some embodiments, the first and second image portions are combined upstream from, and outside of, the optical relay. This thereby enables that the optical relay can be configured as a non-telecentric relay having reduced aberrations (e.g. reduced geometrical aberrations).

According to some embodiments the optical relay is configured as a refractive and/or diffractive relay. In this case optical relay includes at least a first and second lens-sets arranged along an optical path with an optical distance between them matching a sum of their focal lengths. Each of the first and second lens sets may include at least one refractive and/or diffractive lens.

To this end in some embodiments the optical relay is configured as a reflective relay including at least a first and second reflective surfaces having respective optical powers. Such reflective optical relay provides reduced chromatic aberrations in the combined projection. The least a first and second reflective surfaces may be arranged along an optical path of the relay (of the system in general) such that an optical distance between them matches a sum of their focal lengths According to some embodiments the optical relay is configured as a folded reflective optical relay that is characterized in that a physical distance between the first and second reflective surfaces is smaller than an optical distance between the them measured along the optical path of the optical relay. This a compact optical relay configuration, suitable for use in compact eye projection systems.

According to some embodiments the reflective relay includes a set of one or more deflectors arranged to define the optical path within the relay between the first and second reflective surfaces.

According to some embodiments, the first and second reflective surfaces of the optical relay are arranged along a common plane. The set of deflective surfaces include:
 a first and second beam splitters located along the optical path respectively upstream from the first reflective surface and downstream from the second reflective surface to respectively define input and output optical ports of the optical relay; and
 one or more deflectors arranged to define the optical path with the desired optical distance between the first and second reflective surfaces.

According to some embodiments of the present invention the image projection module includes a single image projection unit. The single image projection unit is configured and operable at a certain total frame rate for projecting a sequence of frames including the first image portions projected at a first fraction of the total frame rate and the second image portions projected at a second fraction of the total frame rate. In such embodiments the optical multiplexing module includes adaptive magnification optical relay module that is configured with adjustable magnification ratio. The adaptive magnification optical relay module is located downstream from the single image projection unit with respect to direction of light propagation from the single image projection unit. The adaptive magnification optical relay module is operable in time synchronization with timings of projections of the first and second image portions by the single image projection unit such that it affect different first and second magnification ratios to respective projections of the first and second image portions. This thereby provides for outputting from the optical relay a time multiplexed combined projection of the first and second image portions with the second image portion having larger angular extent than the first image portion.

According to some embodiments the adaptive magnification optical relay module includes at least a first and second group of lenses arranged along the optical path. At least one group of the first and second groups of lenses is configured as an adaptive group having its focal length and location of its effective principal optical plane adjustable in between at least two states. The first and second groups may be arranged such that an optical distance between their effective principal optical planes equals a sum of their optical lengths at these two states such that adaptive magnification optical relay provides different magnification ratios in these two states.

According to some embodiments the adaptive group of lenses includes at least a first and second adaptive lens sets arranged such that their respective effective principal optical planes are at different locations along the optical path and having their respective effective focal lengths switchable between several (e.g. two) operational modes of each lens. For instance the several operational modes of the adaptive lens set may include:
 (i) LENS-OFF operational mode of each adaptive lens set provides an infinite focal length of the adaptive lens set; and
 (ii) LENS-ON operational mode of the adaptive lens set provides that the adaptive lens has a certain finite focal length; and According to some embodiments the first and second groups of lenses in the adaptive relay include the adaptive group of lenses and a non-adaptive group of lenses, which has a fixed focal length and fixed location of its principal optical plane. In such embodiments the magnification states of the relay include a first and a second magnification states in which the first and second adaptive lens sets of the adaptive group are set, respectively, to different combinations of the LENS-ON and LENS-OFF operational modes thereof. Accordingly, in the first and a second magnification states, the adaptive group has different effective focal lengths and different locations of its effective principal optical plane along the optical path, thereby providing different optical magnifications of the optical relay.

In some implementations the optical distances between the different locations of the effective principal optical plane of the adaptive group in the two states matches a difference between the effective focal lengths of the adaptive group in the two states. This may provide that the optical relay has the similar optical power (similar finite optical length or infinite focal lengths (no optical power) in the two states of operation thereof.

In some implementations the adaptive magnification optical relay is configured such that:
  in the first magnification state, the first and second adaptive lens sets are set respectively to LENS-ON and LENS-OFF operational modes to thereby provide a first magnification ratio of the adaptive magnification optical relay; and
  in the second magnification state, the first and second adaptive lens sets are set respectively to LENS-OFF and LENS-ON operational modes to thereby provide a second magnification ratio of the adaptive magnification optical relay.

According to some embodiments, each one of the first and second adaptive lens sets includes at least one tunable liquid crystal diffractive lens.

According to some embodiments in which a single image projection unit is used, single image projection unit is configured to project the sequence of frames of the first and second image portions by utilizing at light in at least three monochromatic primary colors. In this case the tunable liquid crystal diffractive lens is configured and operable to have the same optical power with respect to the at least three monochromatic primary colors, thereby suppressing chromatic aberrations.

According to some embodiments of the present invention the system includes a projection controller. The projection controller is configured and operable for receiving data indicative of the first and second image portions to be respectively projected on the foveal and peripheral rations of the retina (e.g. it may receive data indicative of the entire image to be projected on the retina and segment it to the first and second image portions).

The controller is also configured and operable to:
  (i) operate the single image projection unit for projecting the first image portion with the first frame rate being of at least 25 FPS (and more preferably at least 30 FPS) in order to exceed the perception rate of the fovea; and operating the adaptive magnification optical relay module in synchronization with projections of the first image portions so as to affect a first magnification ratio to the projections of the first image portions. The optical relay is configured such that the first magnification ratio provides for projecting the first image portions on the foveal region of the retina; and
  (ii) operate the single image projection unit for projecting said second image portion with the second frame rate being of at least 60 FPS (more preferably at least 90 FPS) in order to exceed the perception rate of the peripheral regions of the retina; and operating the adaptive magnification optical relay module in synchronization with projections of the second image portions so as to affect a second magnification ratio to the projections of the second image portions. The optical relay is configured such that the second magnification ratio is larger than the first magnification ratio and is adapted to project the second image portions to cover the peripheral regions of the retina.

According to some embodiments the system includes at least a first and a second image projection unit configured and operable for projection of at least the first and the second image portion respectively, and the system also includes an eye projection optical module optically coupled to the at least first and second image projecting units and configured and operable to combine optical paths of projection of the at least first and second image projection units along a general optical path along which to light beams from the first and a second image projection units, associated with projection of said projection of the first and a second image portions respectively, are to be directed to propagate towards a user's eye to project a spatially combined image comprising the first and second image portions on the retina.

In some embodiments, the second image projection unit may be configured to project the second image portion with an angular extent larger than an angular extent of the first image portion projected by the first image projection unit.

In some embodiments, the first image projection unit may be configured to project the first image portion, on a first, central, region of the retina, such that it covers a foveal region of the retina and the second region covers at least a portion of a parafoveal region of the retina surrounding said foveal region.

The first and second projection units may further be configured and operable to allow projection of image portions of relatively higher image projection quality on the foveal region of the retina and image portions of relatively lower image projection quality on peripheral regions of the retina. The image projection quality may be associated with at least one of the following: angular resolution, and color depth, of the image projection.

According to some embodiments, at least one of the first and second image projection units may be a scanning based image projecting unit configured and operable for projecting images by scanning an image encoded light beam on the retina.

According to some embodiments, the system may further comprise a control unit associated with an eye tracking module configured and operable for detecting changes in a gaze direction of the eye; and wherein said eye projection optical module comprises a trajectory module configured and operable for adjusting a general optical path of the image projection towards the eye; said control unit is adapted to operate said trajectory module in accordance with detected changes in the gaze direction.

The eye tracking module may be configured and operable for detecting changes in a lateral location of a pupil of the eye relative to the system, and said control unit is adapted to operate said trajectory module in accordance with detected changes in said lateral location of the pupil.

The control unit may be configured and operable for operating said trajectory module to compensate for said detected changes and thereby maintain the combined image projected at a fixed location on the retina.

According to some embodiments, said eye projection optical module is configured to direct the input light into the user's eye and toward the retina through the pupil such that a cross section of the light field (e.g. at full width half max, or at 25% intensity) is smaller than the user's pupil. This provides an eye-box having diameter smaller with respect to the user's pupil. The eye projection optical module may be configured for varying at least one of location and angle of the eye-box in accordance with data on the gaze location of the user's pupil received from the eye tracking module, to thereby align the exit pupil with the optical axis of a user's eye.

According to yet another embodiment, the system may also comprise a control unit, configured and operable for obtaining imagery data indicative of a content of combined image that should be projected to the user's eye, and segmenting said imagery data to said at least first and second image portions such that the first and second image portions are complementary image portions projectable by the single and/or by the first and second image projection unit(s) on to the central and periphery regions of the retina to thereby project the combined image projection on the retina.

The optical projection module may comprise an optical combining/multiplexing element configured to combine image projection of the first and second image projection units such that a first optical field generated by the first image projecting unit and associated with the projection of said first image portion propagates along a central region of a plane perpendicular to an optical axis of said optical projection module and second optical field generated by the second projecting unit propagates at a peripheral region of said plane with respect to said central region.

To this end, the first and second optical fields may be projected with respectively higher and lower image projection quality, and the second projecting unit is configured to provide image projection onto a donut-shaped field of view thereby providing image projection to the parafoveal region.

Additionally or alternatively, the first and second optical fields may overlap at a boundary region between said central and peripheral regions thereby providing projection of overlapping parts of the first and second image portions in the boundary region. The first and second image portions may be registered such that the overlapping parts projected by the first and second image projection units correspond to the similar image content.

According to some embodiments, the system may be configured for use in a head mounted display unit.

According to some embodiments, the system may be configured to provide virtual or augmented reality experience.

In some embodiments, the eye projection optical module may be configured to direct images projected by the first and second projecting units to the user's eye while blocking surrounding ambient light.

In some embodiments, the eye projection optical module may be configured to direct images projected by the first and second projecting units to the user's eye while allowing transmission of surrounding ambient light, thereby providing a transparent display.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 1A and 1B are a block diagram and a flow chart schematically illustrating the configuration of an eye projection system according to an embodiments of the present invention and a method of operation of a control unit according to the present invention for operating the eye projection system;

DETAILED DESCRIPTION OF EMBODIMENTS

Figure 2:
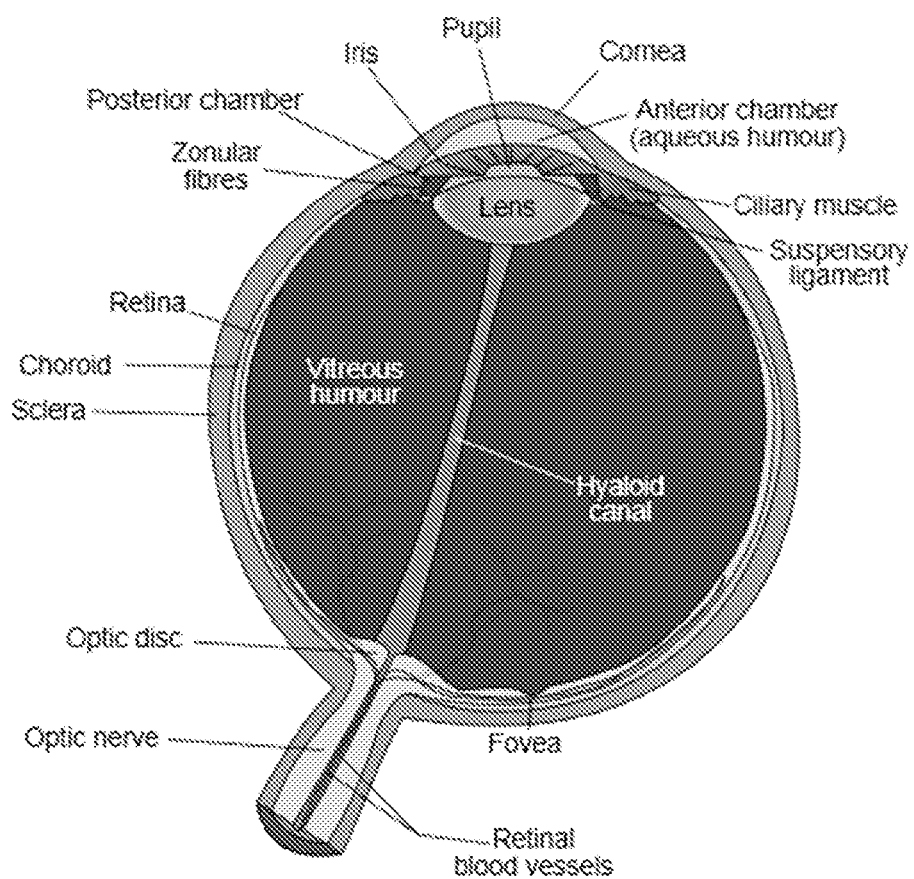
FIG. 2 shows a schematic illustration of a human eye.

As indicated above, there is a need in the art for novel configuration of an eye projection system. Reference is made together to FIGS. 1A and 1B illustrating schematically eye projection system 100 and method 250 for projection of an image into a user's eye according to some embodiments of the present invention. The eye projection system 100 is configured to generate images and project the generated images into a user's eye 10. More specifically, according to some embodiments of the invention, the eye projection system 100 is configured and operable as a retinal projection system adapted for projecting images directly on a retina of the user's eye(s) 10. The eye projection system is adapted to project the image on the retina such that portions of the image falling (being projected on) the foveal and peripheral regions of the retina (e.g. herein referred to as first and second image portions) may be projected on their respective locations on the retina with different spatial resolution (different pixel densities) and/or with different temporal resolution (different frame rates).

For simplicity, components of the eye projection system 100 for projecting the images to a single eye are shown in this illustration; however it should be understood that generally the image projections system 100 may be configured to project images to both the user's eyes, while allowing certain differences between the right eye images and the left eye images, to provide three dimensional experiences. To this end, the system 100 may include duplication of some or all of the components shown in the illustration for projecting to both user eyes.

Thus, as illustrated in FIG. 1A, according to some embodiments of the present invention the eye projection system 100, which can be used in the retinal image projection, includes:

(i) an image projection module 11 which is configured and operable for projecting at least first and second image portions corresponding respectively to first and second parts of an image which are to be respectively projected on foveal and peripheral regions of the retina of the eye 10; and (ii) an optical multiplexing module 125 being optically coupled to the image projection module 11 for receiving the at least first and second image portions projected thereby, and configured and operable to combine (multiplex) the projections of the at least first and second image portions, for generating a combined image projection that is output for propagation along a general common optical path which is to be directed towards the retina of the user's eye 10.

To this end, as described more specifically with reference to FIGS. 4A to 4G and FIGS. 5A to 5B below, in various embodiments of the present invention the optical multiplexing module 125 may be configured and operable to implement spatial and/or temporal multiplexing in order to combine the projections of the first and second image portions for generating the combined image which is then to be projected onto the retina of the eye 10. Thus, the optical multiplexing module 125 is configured and operable to combine the first and second image portions in at least one of spatial and temporal multiplexing such that with a lateral extent of the combined projection/image is similar to a lateral extent of the second (peripheral) image portion in the combined projection/image. For instance, the second/peripheral image portion may extend over the entire lateral extent of the combined image while it may or may not cover the central region/part of the combined image projection and in some cases it may only be projected to cover frame regions of the combined image projection. Moreover, the optical multiplexing module 125 is configured and operable to multiplex the first and second image portions such that the lateral extent of the first image portion in the combined image projection is smaller than and within the lateral extent of the combined projection. Accordingly, upon directing the combined projection (combined image) towards the retina of the eye, the combined image may be directed such that the projection of the first (foveal) image portion covers the foveal region of the retina of the eye 10 and the projection of the second image portion covers at least the peripheral region of the retina of the eye 10.

According to some embodiments of the present invention the system 100 (namely the image projection module 11 and/or the optical multiplexing module 125) is configured and operable for generating and/or combining the first and second image portions such that they have respectively higher and lower spatial pixel densities in the combined image/projection. This thereby optimizes the combined projection to correspond respectively to higher and lower spatial resolutions of the respective foveal and peripheral regions of the retina onto which the first and second image portions in the combined image/projection are respectively projected.

In this connection, it should be understood that the optical multiplexing module 125 is an imaging multiplexing module which includes imaging optics and is adapted to combine the at least first and second image portions so as to form a combined image thereof. This is different from non-imaging optical beam multiplexing modules/techniques (e.g. sometimes used in optical communication) for which there may not be any requirement for maintaining the image content across the multiplexed beams. More specifically, an imaging multiplexing module is characterized in that it multiplexes combines (temporally or spatially) the "projection beams" of the two, first and second, image portions while substantially not impairing (namely preserving) the intensity profile/distribution of the light across the beams so as not to substantially impair/alter the image portions projected by these beams.

According to some embodiments of the present invention the system 100 (namely the image projection module 11 and/or the optical multiplexing module 125) is configured and operable for generating and/or combining the first and second image portions such that they have respectively lower and higher frame rates in the combined image/projection. This thereby optimizes the combined image/projection to correspond respectively to lower and higher temporal resolutions of foveal and peripheral regions of the retina of the eye 10.

The system 100 may also include an optical module 120 which is configured and operable to direct light corresponding to combined image/projection into the user's eye 10 to form images on the user's retina 12. Examples of an optical module configured for directing projection of images on to the retina of a user's eye 10, while possibly tracking the gaze direction and/or the lateral position of the eye to direct the image projection on to a desired/proper location on the retina are disclosed for instance in Patent Application Publications Nos. WO 2015/132775 and WO 2017/037708 which are co-assigned to the assignee of the present Patent Application and incorporated herein by reference. Such optical modules may typically/optionally include an optical relay 126, while possibly also including one or more adjustable deflectors for directing/adjusting the general optical path of the image projection to track changes in the relative location of the eye (lateral location) and the relative gaze direction of the eye (line of sight direction of the eye), relative to the eye projection system 100 such that the projected image (combined image projection in the present case) falls on the correct location on the retina while the gaze and position of the eye relative to the eye projection system 100 may change/vary. To this end the optical module 120 may also include an eye tracking system/module (as described in the above referenced PCT patent publications) for monitoring the gaze and/or literal position of the eye and operation the corresponding adjustable deflectors accordingly.

The optical relay 126 is generally an imaging optical relay, which relays an image input thereto at an input port/pupil therefor to output at a different location (e.g. being the output pupil/port thereof), while possibly with certain optical magnification. The optical relay may not have any net focal power and may thus be configured and operable not to affect any focusing on the light relayed thereby, but only possibly affect magnification. In this regard, it should be understood that the optical relay 126 is an imaging optical relay (contrary to the non-imaging (beam) relay) and is adapted to preserve the image information across the beams relayed thereby.

Figure 4A:
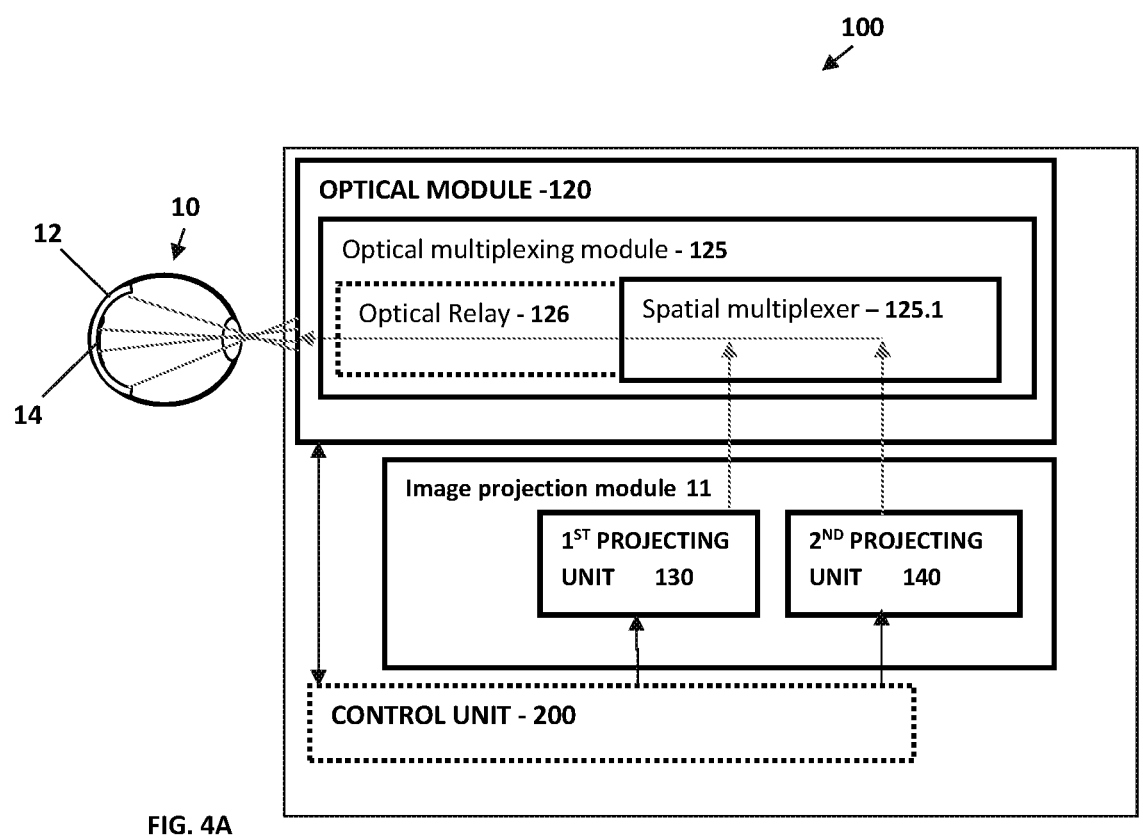
FIGS. 4A to 4G are schematic illustration of an eye projection system according to several embodiments of the present invention, and various modules thereof, in which the system is configured with two image projection units for projection the first and second image portions and with spatial optical multiplexer for combining first and second image portions to form the combined image projection.
Figure 4B:
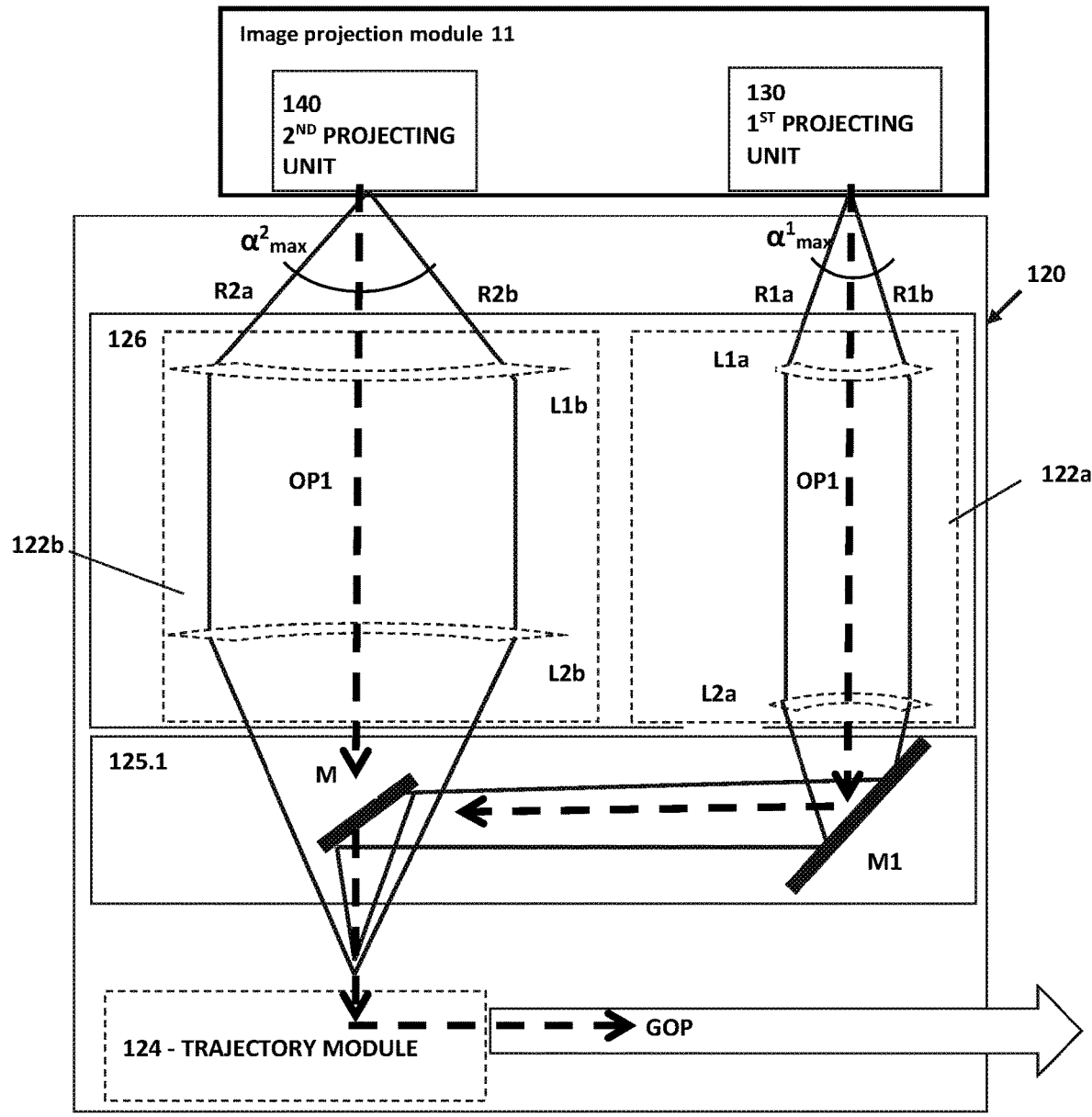
Figure 4C:
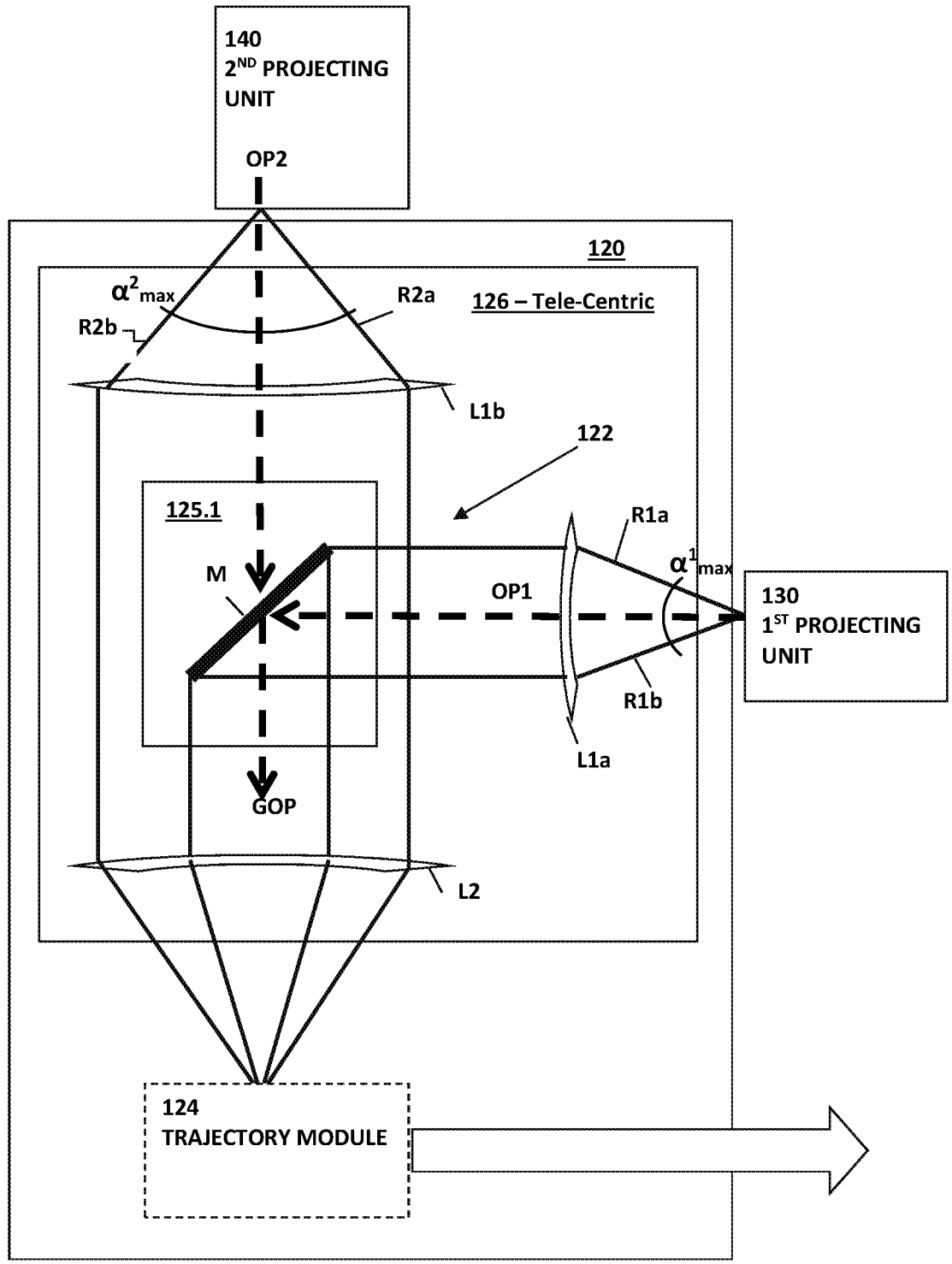
Figure 4D:
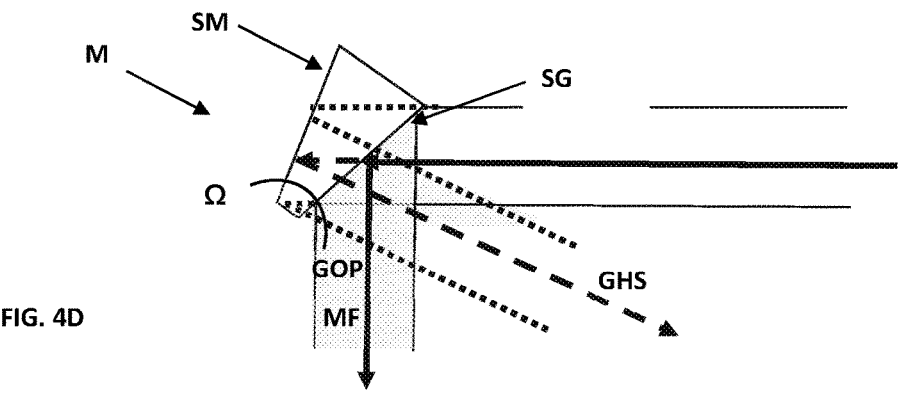
Figure 4E:
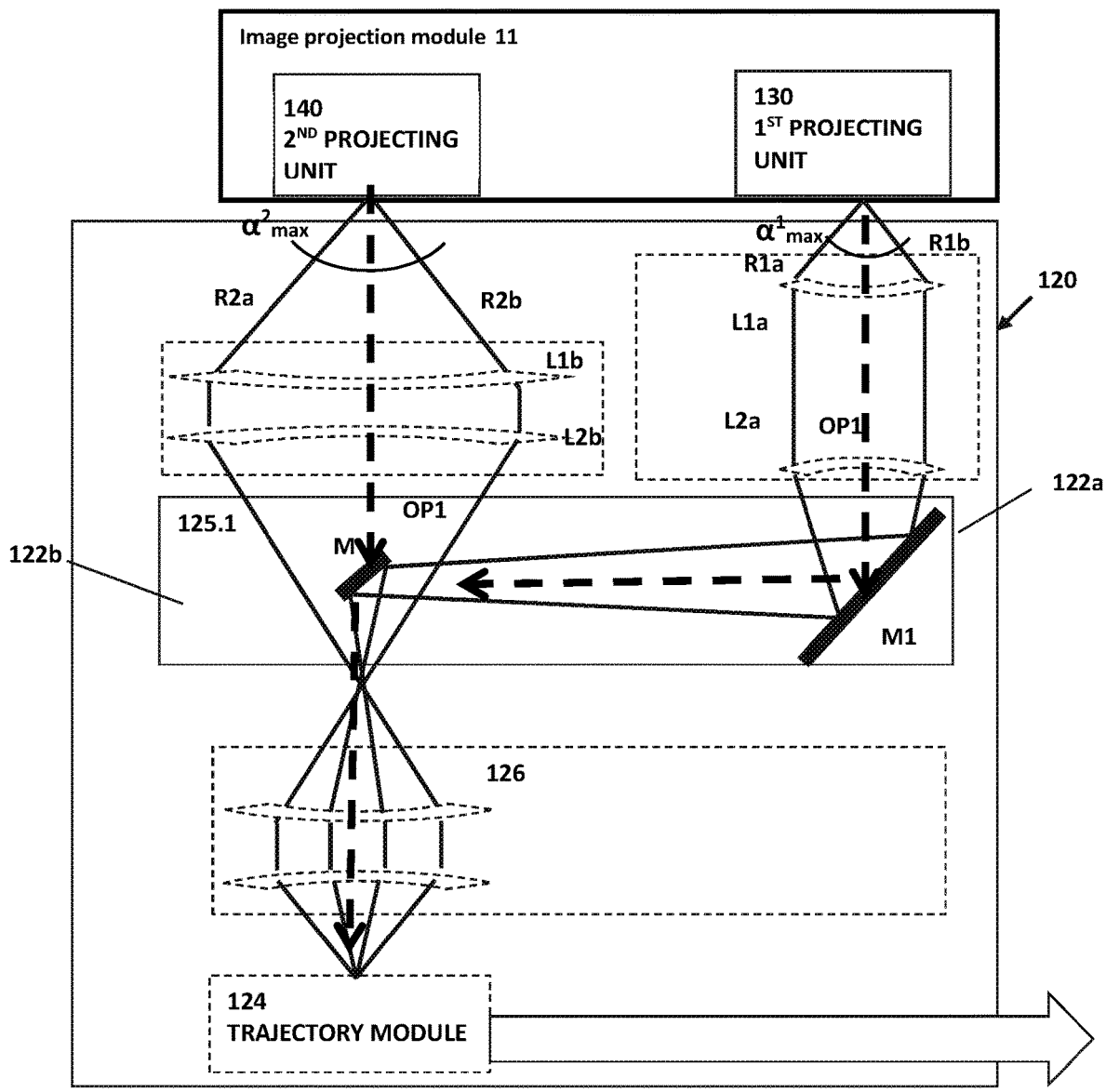
Figure 5A:
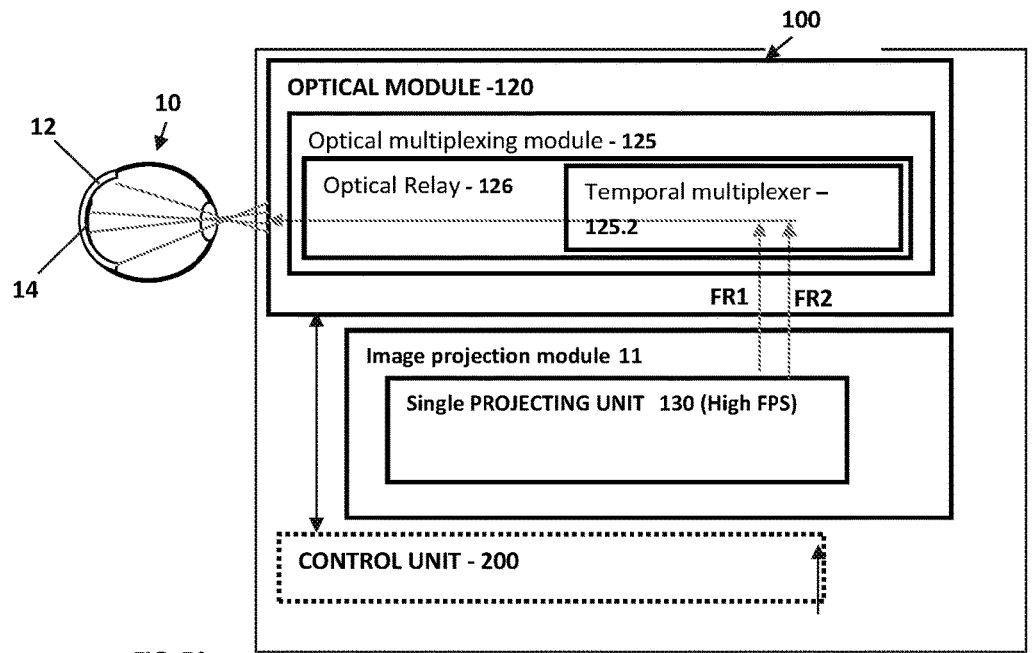
FIGS. 5A and 5B are schematic illustration of an eye projection system according to two embodiments of the present invention, in which the system is configured with a single image projection unit for projection a time sequence of the first and second image portions and with a temporal optical multiplexer for temporally combining the sequence of the first and second image portions to form the combined image projection.
Figure 5B:
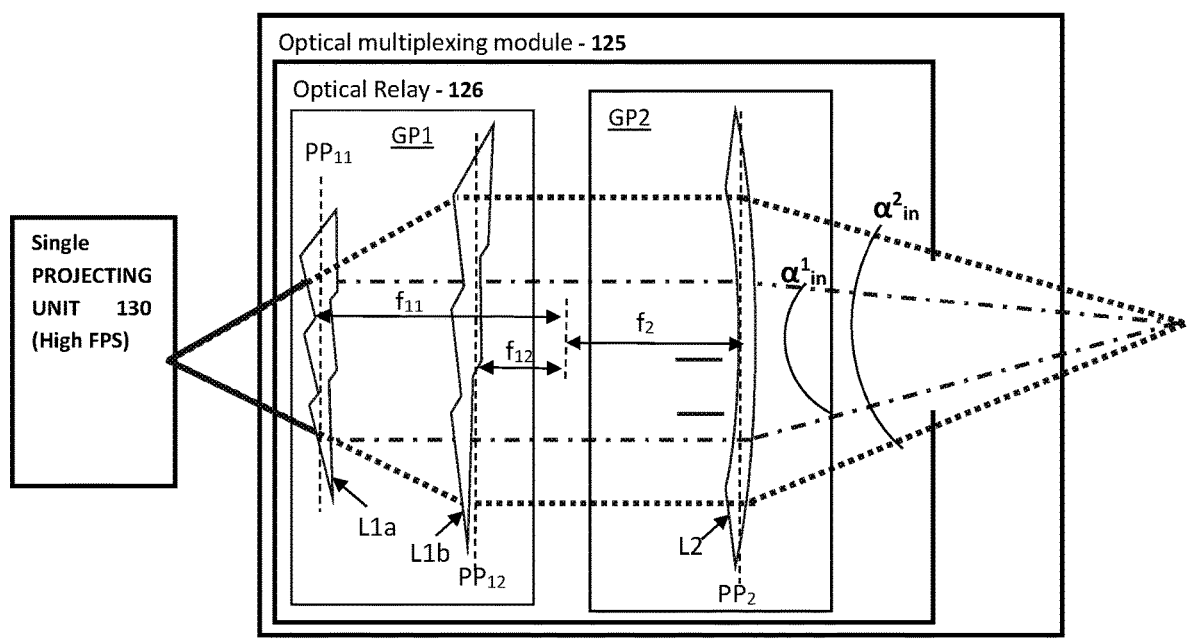

It should be understood that in various embodiments of the present invention, in which optical relay 126 is used, the optical multiplexing module 125 may be located upstream from the optical relay 126 (see for instance FIG. 4B), downstream from the optical relay 126 (see for instance FIG. 4E), and/or it may be integrated with the optical relay 126 itself (see for instance FIGS. 4C and 5B).

The system 100 may generally also include, or be connectable to, at least one control unit 200. The control unit 200 is typically configured to obtain input video and/or image data which is/are to be projected to the eye 10 and process the input video and/or image data to render image data of the first and second image portions which are to be transmitted to the foveal and peripheral regions of the eye's retina with possibly different resolutions and/or with different frame rates. Then the control unit 200 provides/communicates the first and second image portions of the image projection module 11 which in turn generates and projects the first and second image portions with the desired resolutions and frame rates to optically propagate to the optical module 120 where they are spatially and/or temporally multiplexed/combined to form the combined image projection to be projected on the retina.

To this end, processing the image data and rendering the at least first and second image portions may include carrying out the operations of method 250 as described forthwith. The control unit 200 may be configured and operable for carrying out operation 251 for receiving imagery data indicative of the content of a "projection image frame" (also referred to herein as combined image) that should be projected to the user's eye. The "projection image frame" may be a still image that should be repeatedly projected on the retina for a certain period of time and/or it may be a video frame, being a part of a video image sequence to be projected on the retina. The imagery data may, for example, include a content and layout of image(s) that should be projected onto the retina (where the content may be information of one or more images that should be simultaneously projected onto the retina, and the layout may include information about the arrangement/layout of the projection of these one or more images). The layout data may include for example lateral positioning data indicative of the lateral position of the image(s) on the retina (e.g. data about an anchor point in the image(s) representing a point of intersection between the LOS of the eye and the image plane).

The control unit 200 may be adapted to carry out optional operation 252 for processing the imagery data to determine/produce a "projection image frame" indicative of the combined optical field (image content) that should be projected onto the retina. For instance, in some cases the "projection image frame" is formed by concatenating a plurality of images that are included in the image data, while arranging them in the frame in accordance with the layout data.

In optional operation 253, the control unit performs a registration operation to register the "projection image frame" relative to the optical axis (LOS) of the eye. In other words, registration/alignment data indicative of aligned position of the "projection image frame" is relative to the LOS of the eye (e.g. registration/alignment data may be indicative of a point in the "projection image frame" which should be intersected by the LOS axis of the eye).

In operation 254, the control unit 200 segments the "projection image frame" into two or more segments (the at least first and second image portions), which are to be projected onto the central (foveal) region of the retina and onto the periphery (parafoveal) region of the retina, respectively. Accordingly, in operation 254, the control unit 200 segments the "projection image frame" by utilizing the registration/alignment data obtained in 253 in order to determine the location on the retina at which each section of the image falls and thereby determines in the "projection image frame" the boundary between the first and second image portions, which respectively falls on the foveal and parafoveal regions on the retina. To this end, sections which fall on the parafoveal (peripheral) retinal regions are segmented to the second image portion, while sections falling on the foveal retinal region are segmented to the first image portion. Accordingly the control unit 200 segments the "projection image frame" into at least two image portions which are respectively projected onto the foveal and parafoveal regions of the retina.

In this regard it should be noted that for carrying out such segmentation, the control unit may utilize projection unit configuration data which is indicative of the projection parameters of the image projection module 11 and possibly also of the optical parameters of the optical module in projecting the first and second image portions.

For instance, in embodiments including two (first and second) image projection units, 130 and 140 and spatial image multiplexing 125.1 for concatenating their projected image portions (see embodiments of FIGS. 4A to 4E), the numerical apertures (NAs), of the first and second image projection units, 130 and 140 and/or of their following magnification optics (e.g. initial/magnification relay modules 122a and 122b respectively) may be considered/processed to determine data on the regions of the retina which are covered by each of the projection units and their angular-extents). This allows the control unit 200 to properly segment and divide the "projection image frame" between image projection units, 130 and 140.

Alternatively or additionally, in embodiments including a single image projection unit 130 projecting sequence (e.g. interleaved/interlaced sequence) of the first and second image portions, and temporal image multiplexing 125.2 temporally applying different optical magnifications at times the first and second image portions are respectively projected (see embodiments of FIGS. 5A and 5B), the numerical apertures of the single image projection unit 130 and/or of the different optical magnifications applied respectively to the projections of the first and second image portions are considered/to determine data on the regions of the retina which are covered by the projections of each of first and second image portions and their angular-extents. This allows the control unit 200 to properly segment and divide the "projection image frame" to the first and second image portions.

In 255 the control unit 200 carries out rendering of the first and second image portions that are to be projected by the image projection units, 130 and 140, respectively. The control unit 200 may utilize the projection unit configuration data, which may be indicative of projection parameters such as angular resolution and color depths provided by the image projection module 11 (namely units 130 and/or 140), to render the respective first and second image portions accordingly. In this regard, as indicated above, the first image projection unit 130, which is configured for projection of images to the foveal region of the retina, may be configured for projecting images on the retina with higher angular resolution (higher DPI) and/or with improved color depth, than the angular resolution (DPI) and/or the color depth provided by the second of the image projection units, 140, which projects images on a parafoveal region of the retina. Alternatively, or additionally, the control unit 200 may be adapted to operate the image projection module 11 for projecting the first and second image portions at different (e.g. respectively lower and higher) frame rates.

Then in operation 256, the control unit provides rendering data indicative of the first and second image portions to the image projection module 11 (e.g. respectively to the first and second image projection units 130 and 140 in the embodiments of FIGS. 4A to 4E; and/or to the single image projection unit 130 in the embodiments of FIGS. 5A and 5B) for projection thereby.

In this connection, the eye projection system 100 according to the present invention utilizes features of the anatomic structure of the human eye. Reference is made to FIG. 2 illustrating the anatomic structure of a human eye. As the structure of the human eye is generally known, it will not be described herein in detail, but its suffices to state that the retina (12 in FIG. 1) is the photosensitive region collecting light and generating data to be transmitted to the brain. The retina includes a plurality of photosensitive cells being sensitive to light intensity (black and white vision) and to wavelength (colour vision). More specifically, the retina includes rod type cells (rods) that are sensitive to luminosity (intensity of light) and cone type cells (cones) that are sensitive to chroma (colors or wavelengths). A region in the center of the retina includes greater concentration of cone cells (wavelength sensitive cells) and is known as the fovea (marked as 14 in FIG. 1). The fovea is in charge of providing detailed images of what is located at the center of the field of view, or the center of attention. Generally, the foveal region provides higher spatial frequency or higher resolution, and possibly higher color sensing abilities, while the parafoveal region provides low resolution image perception (providing the brain with blurred indication on the periphery of the scene) and possibly lower color sensing abilities, while being more sensitive to movement, rapid illumination changes, and gradients within an input light field. To this end, the parafoveal region is more sensitive to low frame rates (frame rates lower than 60 FPS and in some cases even frame rates lower than 90 FPS may be perceived as blinking by the parafoveal region) than the foveal region which may be insensitive to low frame rates even as low as 25 to 30 FPS or even lower. Accordingly, the image projection module (e.g. units 130 and/or 140) is configured and operable for projection of the complementary first and second portions of the combined optical field ("projection image frame") that is to be projected onto the retina. The first image portion, which is to be directed to the foveal region of the retina, is projected with high image projection quality (i.e. rendering/projecting the first image portion, such that it has a high angular resolution and/or high color depth), while possibly with lower frame rate. The second image portion, which is to be directed to the parafoveal region of the retina, is projected with lower image projection quality (i.e. reduced angular resolution and/or reduced color depth as compared to those of the first image portion), while possibly with higher frame rate to reduced perceived blinking by the parafoveal region.

This provides combined image projection which is suited to the anatomical and perception properties of the retina, while also reducing the amount of image data which needs to be processed by the system.

To this end, according to some embodiments of the present invention the image projection system may include one or more image projection units (e.g. 130 and/or 140) which are configured in a scanning image projection configuration, (by which an image is projected via scanning (raster scanning) a light beam temporally modulated with the image information, on the projection surface (namely on the respective foveal region of the retina). Such scanning image projection configuration of the image projection unit (s) 130 and/or 140 facilitates achieving high quality image projections with compact dimensions of the image projection system 11.

The optical module 120 is configured to combine/multiplex first and second image portions projected by the image projection system 11 and direct their corresponding light rays to form images projected into the user's eye 10.

In this regard, it should be noted that according to some embodiments of the invention, in the segmentation operation 254 of method 250, the control unit 200 segments the "projection image frame" into two (or more) segments (first and second image portions), which have some overlap along a boundary region between them. Accordingly, in such embodiments, the image projection system 11 is configured and operable to project these first and second image portions onto the retina such that they overlap at the boundary area between them. Thus, on the boundary, similar image information is projected in an overlap and with respectively high and low image projection quality, by the first and second image portion units.

The optical module 120 (the optical multiplexing module 125) may be configured to combine first and second image portions generated by the image projection module 11s such that the overlap between the them is maintained. Further, the optical module 120 may be configured and/or operable to direct the projected image portions such that the boundary between the image portions substantially corresponds to the anatomical boundaries of the fovea in the user's retina. The system may include a retinal setting/calibration parameter indicative of the relative size/angular-extend of the foveal image on the retina and/or its boundary location on the retina. The retinal setting/calibration parameter may be adjusted (e.g. via pre-calibration and/or via user's selection) to adjust and/or fit the location and the lateral extent of the projection of first portion of the image on the retina (e.g. to meet the specific anatomical features/parameters of the user. Alternatively or additionally the retinal setting/calibration parameter may be pre-adjusted/preset and/or fixed such that it fits the anatomy of a majority of users.

In various embodiments, the overlap between the first and second image portions which are projected in the combined image/projection is important in order to facilitate the user's perception of smooth and natural transition between the higher quality of the image projected on the foveal region of the retina, and the lower quality of the image portions projected on the parafoveal region(s) thereof, and/or to compensate for inaccuracies and anatomical variations between users.

The control unit 200 may also be responsive to eye tracking data (e.g. obtained from an eye tracking module such as that disclosed in IL patent application No. 241033) on eye 10 orientation and/or position, and provide appropriate commands to the optical module 120 to vary the general path of image projection in order to correct the optical path of image projection in accordance with the eye's 10 movements. For instance, the optical module 120 may include a trajectory module 124 which may include for instance an adjustable gaze tracking beam deflector and/or an adjustable pupil position beam deflector (e.g. which may be configured and operable as described in IL patent application No. 241033). The control unit 200 may be configured and operable for adjusting positions of one or both of these deflectors to vary the general propagation path of image projection in accordance with the gaze direction (direction of the LOS) of the eye, and/or the relative lateral displacement and/or relative angular orientation between the optical axis of the eye and the output optical axis of the optical module 120 e.g. to maintain substantially fixed relative orientation and/or displacement between them. Indeed, when fixed relative orientation and displacement are maintained between the optical axis of the eye and the output optical axis of the optical module 120, the image(s)/image portions from the image projection module 11 are projected at fixed location(s) on the retina.

Alternatively or additionally, in some embodiments, the control unit 200 may be configured and operable to compensate for some/slight changes/shifts in the relative orientation and/or displacement between the optical axes of the eye and the optical module 120, by operating the image projection module 11 (e.g. operating the single image projection unit 130 in FIGS. 5A-5B, and/or coordinately operating both the first and second projection units 130 and 140 in FIGS. 4A-4E) to shift and/or warp the image projected thereby so that the projected optical field (the combined image/projection) is shifted/warped in ways that counteract changes in the relative orientation/displacement. For instance, use of such a technique to compensate for small eye movements is exemplified in more detail below with reference to FIG. 6.

Thus, the eye projection system according to the present invention is generally configured to provide image projection with increased resolution to the foveal region of the retina, while providing image projection with relatively lower (e.g. normal) resolution to the parafoveal region surrounding the fovea. This enables the system to reduce complexity of image rendering/processing with respect to images of high resolution, while providing high resolution images to regions of the user's eye that will actually utilize the high resolution image and require it.

Figure 3:
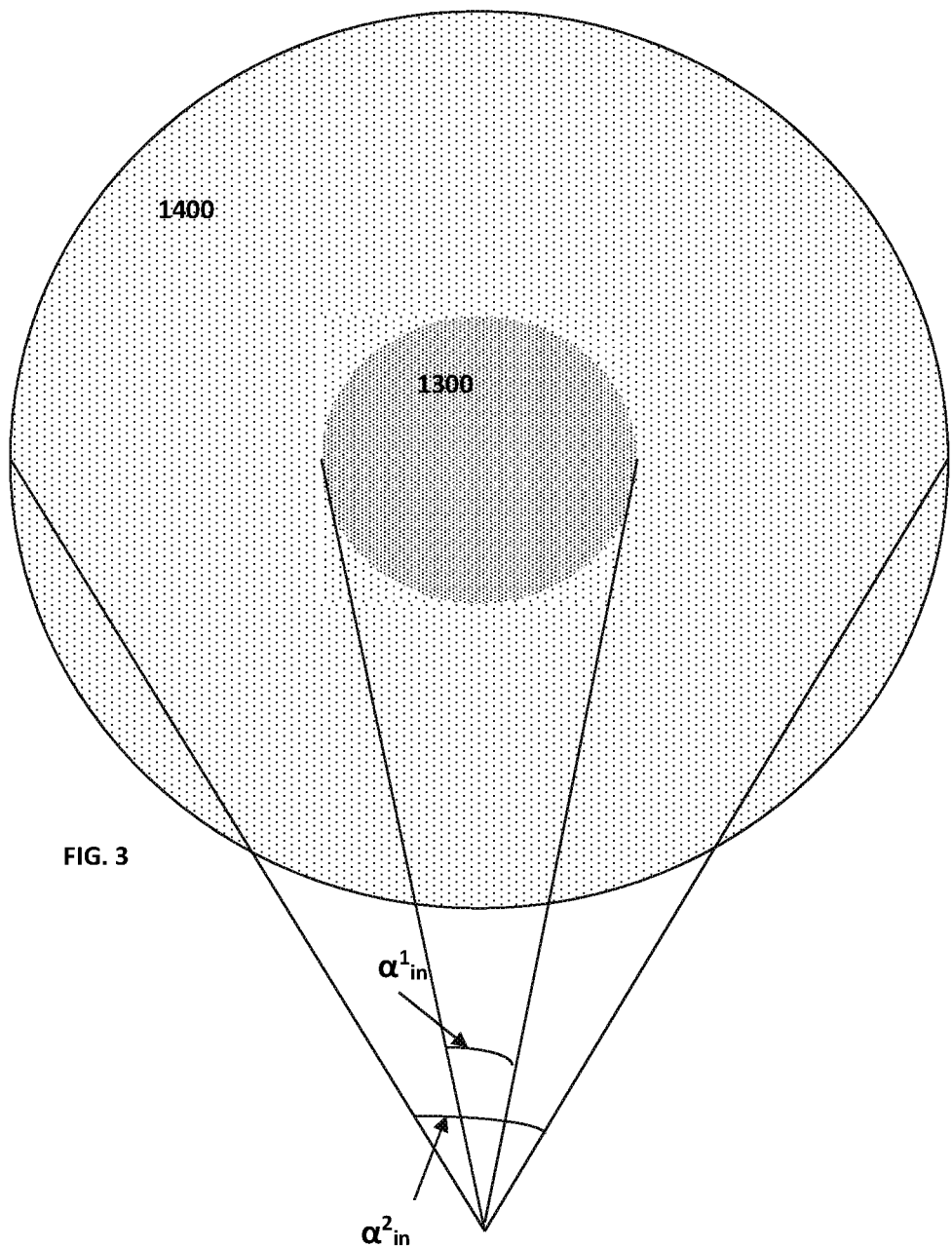
FIG. 3 illustrates schematically image arrangement generated according to the technique of the present invention.

FIG. 3 illustrates a two-portion image generated by the eye projection system of the invention. The complete image includes two image portions (generally at least two, as the periphery image portion may be composed of several sub-images generated by several projection units) including the parafoveal/retinal image portion 1400 providing peripheral image data, which generally surrounds the center of attention; and the foveal image portion 1300 providing the main part of the image data and which corresponds to the center of attention of the user. The foveal image portion 1300 may typically be of higher resolution with respect to the parafoveal image portion 1400. The actual number of pixels of the foveal portion 1300 and the parafoveal portion 1400 may be the same or higher. The difference in image resolution may typically be provided due to a different area (field of view) covered by each image portion. Specifically, the foveal image portion may generally be projected to cover the actual area of the fovea, or a lightly larger area, which is significantly smaller with respect to the surrounding area of the retina. It should be noted that the image portions as shown in FIG. 3 exemplify a circular field of view. However, generally the field of view may be rectangular, oval or of any other shape. The foveal region 1300 of the projected image may preferably be of circular shape or oval so as to cover the field of view of the fovea and thus optimize the sharp vision abilities of this region of the eye. Also exemplified in FIG. 3 is an angular range of the foveal 1300 and parafoveal 1400 image portions at the user's pupil. Typically the angular range of the foveal image portion may be $\alpha^1_{in}$ and may be between 3° and 10°, and preferably about 5°. Additionally, the angular range $\alpha^2_{in}$ of the parafoveal image portion at the pupil input may be higher than 20°, and typically about 120°--180°.

Referring together to FIGS. 4A-4C and 4E several embodiments of the eye projection system 100 including at least first 130 and second 140 image projection units/modules (hereinafter also referred to as projection units), whose images (foveal and peripheral image portions) are spatially multiplexed, are illustrated. The first and second image projection units, 130 and 140, are configured and operable for spatially separated projection of at least the first and second image portions. In these embodiments, the optical multiplexing module 125 of the optical module 120 includes a spatial multiplexer 125.1 configured and operable to spatially combine the images (first and second image portions) from the first 130 and second 140 image projection units/modules so as to form a combined image including: (i) the first image portion from the first image projection modules 130 fully within the lateral extent of the combined image (e.g. covering the center of the combined projection/ image and not extending through the entire area of the combined projection/image) and (ii) the second image portion from the second image projection module 140 projected over a larger lateral extent to define the boundaries and therefore the lateral extent of the combined projection/ image. In other words, the optical multiplexing module spatially combines the least first and second image portions such that the first image portion is at a central region of the combined image/projection, and the second image portion, extends laterally over an annular region enclosing the central region of the combined projection/image. Thus, in the combined projection/image, the first image portion has a smaller lateral extent than the second image portion such that the second image portion frames the first image portion. When projected to the eye, the second image portion is thus directed to cover the peripheral region(s) of the retina and the first image portion is directed to cover the foveal regions of the retina.

According to some embodiments, the first 130 and second 140 image projection units are configured in accordance with their respective numerical apertures (and/or in accordance with the respective numerical apertures of their corresponding magnification relays modules 122a and 122b such that pixel density in the first image portion outputted from the first image projection unit 130 (e.g. outputted from the corresponding magnification relay module 122a) is higher than the pixel density in the second image portion that is outputted from the second image projection unit 140 (e.g. outputted from the corresponding magnification relay module 122b). Accordingly, the foveal region of the retina is projected by high resolution image while obviating a need to process and project high resolution image portions on the peripheral regions of the retina. For instance, even in cases where image projection modules 130 and 140 provide the similar spatial resolution, since the second image portion from the image projection modules 140 extends over a larger area (e.g. configured to cover the peripheral regions of the retina, its pixel density, when projected on the retina, is smaller as compared to that of the first image portion which is configured to cover only the foveal (central) region of the retina).

Optionally, in some embodiments the first and second image projection modules, 130 and 140, may be configured and operable for respectively projecting the first and second image portions at different frame rates. For instance, the first image projection module 130 may be adapted to operate at a frame rate as low as 25-30 frames per second (FPS), since the foveal ratio of the retina is less sensitive to low frame rates (or to blinking images) while the second image projection module 130 may be adapted to operate at higher frame rate (e.g. greater than 50 FPS and more preferably greater or equal to 60 FPS, even more preferably at least 90 FPS), since the peripheral region of the retina is much more sensitive to low frame rates (or to blinking images). This may be achieved by specific configuration of the image projection modules 130 and 140 for projecting their respective image portions at respectively lower and higher frame rates.

The optical module 120 may also be configured to direct light corresponding to images projected by the projection units towards the user's eye 10 to form images on the user's retina 12. To this end, the optical module 120 may include and optical relay 126 which may be located before, after and/or integrated with the spatial multiplexing module 125.1 with respect to direction of light propagation through the optical module. These embodiments are illustrated and described in more detail below with reference to FIGS. 4A to 4G.

As indicated above, the system may generally also include, or be connectable to, at least one control unit 200. The control unit 200 is typically configured to render image data and transmit it to be projected by the first and second projection units 130 and 140. To this end, rendering image data to be projected by the two or more (first and second) projection units 130 and 140 may include carrying out the operations of method 250 as described above.

Accordingly, the image units 130 and 140 are configured and operable for projection of the complementary, first and second, portions of the combined optical field ("projection image frame") that is to be projected onto the retina. The first image projection unit 130 is configured and operable such that it can project a first image portion, which is to be directed to the foveal region of the retina, with high image projection quality (i.e. rendering/projecting the first image portion, such that it has a high angular resolution and/or high color depth). The second image projection unit is configured for projecting the second image portion (which is to be directed to the parafoveal region of the retina, with lower image projection quality (i.e. reduced angular resolution and/or reduced color depth as compared to those of the first image portion).

For instance the image projection unit 130 may be configured and operable for projecting certain portion(s) of the projection image frame with high angular resolution, which is about or below 4 arc-minute$^2$ of solid angle per pixel. The image projection unit 140 may be configured and operable for projecting certain portion(s) of the projection image frame with low angular resolution, which is about or above 10 arc-minute$^2$ of solid angle per pixel. In some embodiments the image projection unit 130 is configured for projecting its respective image portions with RGB color contents (e.g. with color depth of at least 8 bit (256 colors) or higher (e.g. 24 bit)). The image projection unit 140, which is used for projecting images onto the periphery of the retina, may be configured for projecting its respective image portions with lower color depths (e.g. 4 bit color depth (16 colors)) and/or with no, or minimal, color information (e.g. gray scale image).

As indicated above, the image projection units 130 and/or 140) may be configured and operable for operating in a scanning image projection configuration/mode, by which an image is projected via scanning (e.g. raster scanning) of a light beam that is temporally modulated with the image pixels information in synchronization with the scanning of the beam on the projection surface (namely on the region of the retina). Such scanning image projection configuration of the image projection unit(s) 130 and/or 140 facilitates achieving high quality image projections with compact dimensions of the image projection system 11. In some embodiments both image projection unit(s) 130 and/or 140 are configured as scanning image projection units. Alternatively, or additionally, in some embodiments the image projection unit 140 may be configured in either a scanning image projection configuration; and/or an aerial image projection technique, e.g. which utilizes a spatial light modulator (SLM) to project its respective second image portions onto the parafoveal regions of the retina.

Referring together to FIGS. 4B, 4C and 4E, three configurations of the eye projection system 100 are shown, in which two projection units 130 and 140 are respectively included and respectively configured and operable for projecting the first and second image portions with different quality (resolution and/or color depth) and/or with different frame rates. These embodiments exemplify different specific configurations of the optical module 120 wherein in all the embodiments the optical module includes an optical multiplexing module 125 configured as a spatial optical multiplexing module 125.1 operable to for spatially combining the first and second image portions from the two projection units 130 and 140, and an optical relay for relaying the projections to the proper location from which it is directed towards the eye.

The spatial optical multiplexing module 125.1 includes at least one beam combiner M (e.g. semitransparent deflector/mirror and/or polarized deflector (e.g. in cases where the projection units 130 and 140 are configured to emit polarized light of different light polarizations and/or any other suitable beam combiner as known in the art) and possibly one or more additional deflectors, for combining light propagating from the projection units 130 and 140 along the respective optical paths OP1 and OP2 to propagate along the common optical path GOP. Generally, beam combiner M may be configured to block light transmission from the second projecting unit 140, within the region at the center of the cross section of the field of view. However, in some configurations, the beam combiner M may be configured to partially transmit light passing therethrough, and thus allow at least a portion of light generated by the second projecting unit 140 to pass at the center of the field of view. In some further embodiments, beam combiner M may block at a central region and transmit at the periphery thereof, to allow smooth transition in image projection between the image generated by the first 130 and the second 140 projecting units.

In the embodiment of FIG. 4B the spatial optical multiplexing module 125.1 is located after/upstream—from the optical relay 126 with respect to light propagation direction through the system 100. In the embodiment of FIG. 4E the spatial optical multiplexing module 125.1 is located before the optical relay 126 with respect to light propagation direction. In the embodiment of FIG. 4C the spatial optical multiplexing module 125.1 is integrated with the optical relay 126. In this case the relay module 126 includes two (generally at least two) input ports/lens-sets L1a and L1b and a single output lens-set/port L2, and the beam combiner M in the junction between the optical paths OP1 and OP2.

As indicated above, in the combined projection, the second (parafoveal) image portion should generally be laterally larger than the first (foveal) image portion so as to frame the foveal image portion. To this end, in some embodiments of the present invention the second image projection unit 140 is configured to project the second image portion with an angular extent (magnification) larger than an angular extent of the first image portion projected by the first image projection unit 130.

However as illustrated in FIG. 4B the output angular ranges $\alpha^1_{max}$ and $\alpha^2_{max}$ of the respective first 130 and second 140 projecting units may or may not be configured to provide a the desired angular ranges, $\alpha^1_{in}$ and $\alpha^2_{in}$ of the respective foveal and para-foveal image portions at the pupil/entrance of the eye 10 as described in FIG. 3 above. Therefore, in some embodiments the second image projection unit 140 itself is not configured to provide the second image portion with sufficiently large angular extent. Therefore, as shown in FIGS. 4B and 4E, optionally the optical module 120 includes two magnification relay modules 122a and 122b arranged along the respective optical paths of the first and second image portions from the projection units 134 and 140, and configured and operable to operate on the respective first and second image portions to adjust their numerical apertures such that the angular range $\alpha^1_{in}$ of the first (foveal) image portion entering the eye at the pupil input may be, as described above, between 3° and 10° (typically about 5°), and the angular range $\alpha^2_{in}$ of the second (parafoveal) image portion at the pupil input may be higher than 20° (typically about 120°-180°). To this end the magnification relay modules 122a and 122b are configured and operable in accordance with the numerical apertures of their respective projection units 130 and 140, to magnify the projections of the respective first and second image portions to obtain the above described angular ranges of the foveal and parafoveal image portions entering the eyes. In this regard, it should be understood that generally the magnification relays, 122a and 122b are optional and may be obviated in cases where the image projection units 130 and 140 are configured to provide by themselves the correct numerical apertures. Yet in embodiments, where the image projection units 130 and 140 the first and/or second image portions outputted from the respective image projection units 130 and 140 are not properly magnified (do not have the proper numerical aperture), the respective one or both of the magnification relays 122a and 122b may be included in the system to adjust the proper magnification of the respective image portions, and, more importantly, the ratio between them, since the global magnification of the combined image may also be performed after the first and second image portions are spatially or temporally combined along the common general optical path GOP.

It should be noted that in the embodiment of FIG. 4E the spatial optical multiplexing module 125.1 is located downstream from the optional magnification relays 122a and 122b and upstream from another optical relay 126. In this case the optical relays receives the first and second image portions after they have been optionally properly magnified, and multiplexed/combined together by the spatial optical multiplexer 125.1 and relays them to the desired location from which they can be projected to the eye 10. In such embodiments at least one of the magnification relays 122a and 122b may be obviated even in cases in which the numerical apertures of both the first and second image projection units are not properly set. This is because even in such cases the system 100 may be configured with only one magnification relay 122a or 122b for adjusting the ratio between the angular extents of the first and second image portions, and the common relay 126 may be adapted to magnify the combined projection/image to the desired angular extent.

In contrast, in the embodiment of FIG. 4B the optical relay 126 is located upstream from the spatial optical multiplexing module 125.1, and may include or be constituted by the magnification relays 122a and/or 122b. In this case, the magnification relays 122a and/or 122b may be configured and operable for also relaying the first and second image portions to the correct location/distance of the optical multiplexer, at which they can be combined and from which they propagate along the common global optical path GOP towards the eye 10.

Thus, in both embodiments of FIGS. 4B and 4E the first 130 and second 140 projecting units may optionally be associated with corresponding magnification relay modules 122a and 122b for adjusting the respective angular extents of the first and second image portions provided thereby, and/or the ratio between said angular extents.

In the embodiment of FIG. 4C, the optical relay 126 itself is associated with two input ports/lens-sets (e.g. lenses) for receiving the first and second image portions from the respective projection units 130 and 140, and with one output port/lens-set for outputting the combined image. In this case the optical relay 126 may be configured and operable to provide different optical magnifications along each of the optical paths OP1 and OP2 from the two input ports which are combined to the general optical path GOP to the output port. Such magnifications, as generally known in the art, are associated with the ratios of the focal lengths of the lens-sets at each of the inputs of the optical relay 126 and the focal length of the lens-set at the output. Accordingly, in this case the different magnifications may be provided to the different optical paths and the use of the magnification relays 122a and 122b may be obviated, even in cases where the image projection units provide the first and second image portions with non-suitable/matching angular extents.

As shown in the examples of FIGS. 4B, 4C and 4E, the spatial optical multiplexing module 125.1 typically includes a beam combiner M (which may be of any suitable type as can be appreciated by those versed in the art), and possibly also one or more deflectors, e.g. M1 arranged for deflecting/directing at least one of the individual optical path(s), OP1 and/or OP2 from the respective projecting units 130 and 140, towards the beam combiner M, which is configured to merge image projections generated by the first 130 and second 140 projecting units. In this regard it should be understood that in cases where more than two projection units are used for generating the combined projection/image, one or more beam combiners may be additionally included in the optical path for merging the projections from such projecting units, and may be merged/combined, in parallel or in cascade, such that each projecting unit transmits light to form an image portion (i.e. an optical field) in a corresponding region along a cross section perpendicular to the general direction of propagation of projected light.

Referring particularly to the examples of FIGS. 4B and 4E, each of the first 130 and second 140 projecting units outputs light indicative of an image or an image stream, marked in the figures by extreme light rays R1a, and R1b for the first projecting unit 130, and R2a and R2b for the second projecting unit 140. The output light from the first projecting unit 130 is transmitted into input lens-set of relay module 122a and is relayed onto trajectory module 124. More specifically, the light rays are output from the projecting unit such that different pixels, or different points on the projected image, are associated with corresponding different angles of light propagations. Thus the extreme light rays R1a and R1b correspond to two extreme points on the projected image. First lens-set L1a of the relay unit 122a refracts the light and directs it towards second lens-set L2a which re-focuses the input light onto the trajectory module 124. At the output of relay unit 122a, one or more beam combiners, M1 and M2 are located, as exemplified in the figure. The beam combiners M1 and M2 are configured to combine light projected by the first projecting unit into the optical path of light projected by the second projecting unit 140. Similarly, relay unit 122b typically includes first and second lens-sets L2a and L2b and is configured to relay light projection from the second projecting unit 140 in a substantially similar manner. Exemplary light rays R2a and R2b illustrate the extreme light rays of projection unit 140. Generally, the relay units 122a and 122b are configured with appropriately selected different optical powers of the lens-sets thereof and beam combiners M1 and M2 are located such that images projected by the first projecting unit 130 take a smaller area at a center of a region of image projection, surrounded by portions of images projected by the second projecting unit 140 as exemplified in FIG. 3. Further, it should be noted that generally both relay units 122a and 122b and the beam combiners M1 and M2 are configured to merge the image portions to form a common image plane (e.g. on the trajectory unit 124). This is to ensure common focusing of the user's eye.

It should be noted that the relay unit 122a (as well as any other relay unit such as 122b and 126, which is not specifically described here), may include additional lens-sets and are shown here as two-lens-sets relay units (two lens relay) for simplicity. It should also be noted the optical parameters of the relay units are selected to provide proper imaging with desired resolution and sharpness as generally known and/or can be determined by standard optical design tools.

The combined image projection formed by the projected image portions generated by the first and second projecting unit 130 and 140 is optionally directed onto the trajectory module 124. The trajectory module 124 may include, for example, one or more moving light deflectors/mirrors (e.g. gaze tracking beam deflector and/or pupil position beam deflector as discussed above) configured to vary orientation thereof to direct light impinging thereon with a general optical path determined in accordance with tracking of eye movement. The trajectory module 124 and technique of eye tracking may be of any known configuration, and, as indicated above, an exemplary configuration is described in IL patent application No. 241033 assigned to the assignee of the present application.

FIG. 4C illustrates an additional configuration of the first relay module 126, configured to combine projected first and second image portions from the first and second projecting units 130 and 140 within the relay module 126. In this case the relay module 126 should generally be configured and operable as a telecentric relay. This is because in this case unless the relay is telecentric the combined image will have optical aberrations of order higher than first approximation geometrical aberrations The relay module 122 utilizes a common output/second lens-set L2 while utilizing separate input/first lens-sets L1a and L1b for the first 130 and second 140 projection units. As shown, the output from the second projecting unit 140 is relayed through lens-sets L1b and L2 onto the optional trajectory module 124. Location and optical power of lens-sets L1b and L2 is selected to provide angular distribution of the projected light (exemplified by extreme light rays R2a and R2b) to provide desired angular resolution for peripheral vision of the user. Light output of the first projecting unit 130, exemplified by extreme light rays R1a and R1b, is collected by input lens-set L1a converting the diverging light to a set of parallel light rays propagating towards beam combiner M. The beam combiner M, which, as indicated above, may utilize a single surface (e.g. reflecting surface) or a plurality of surfaces, or may be configured as a partially reflecting surface (e.g. beam splitter type), is configured to direct output light of the first projecting unit 130 to propagate with and be located at the center of the cross section of light output from the second projecting unit 140. The combined image/projection may then be collected and/or directed by the lens-set L2 to be directed/further propagate towards the optional trajectory module 124 which in turn directs it, with the proper lateral and angular orientations, towards the eye 10.

It should be noted that the beam combining technique, i.e. utilizing one (or more) beam combiner M as in FIGS. 4A, 4B, 4C and 4E may be configured to provide certain overlapping between image projection by the first projecting unit 130 (foveal image) and image projection by the second projecting unit 140 (parafoveal image). To this end the one or more beam combiners may be configured as beam splitting surfaces providing 50% reflection and 50% transmission of light, and/or as non-uniform beam combiner surfaces having high transmission (reflection) at the periphery of the surface and high reflection (transmission) at the center of the surface. Thus, the transition between foveal image and parafoveal images may be made relatively smooth. It should also be noted that the graphic processing unit (GPU) may typically be configured to render the different image portions so as to provide smooth transition as described above. For example, the GPU may be configured to render images while adjusting image brightness at image portion boundaries to avoid sharp gradients resulting from image combining.

As indicated above, the beam combiner M is generally a reflective/semi reflective element (possibly polarization dependent reflector/mirror). Conventionally, such a beam combiner M is formed with a slab of substantially transparent material (e.g. glass or plastic and/or birefringent material) possibly coated on one side thereof with reflective/ partially reflective coating. In conventional beam combiners, the front and rear surfaces are typically made parallel to one another. Indeed, primary reflection is obtained from the coated surface (e.g. the rear surface of the beam combiner), but yet some amount of reflection (also referred to herein as ghost reflection), is also obtained from the other (less/non-reflective) surface of the beam combiner.

The inventors of the present invention have noted that in certain implementations of the system 100 as shown in FIGS. 4B, 4C and 4E, using the beam combiner M with the parallel front and rear surfaces may cause both the primary reflections (from the main reflective surface of the beam combiner M) and the ghost reflection (from the less reflective surface of the beam combiner M) to be directed to propagate along the common global optical path GOP and from there to the user's eye. Since the main and ghost reflections are generally not aligned with respect to one another, the ghost reflection causes discomfort to the user, and/or blurry image projection on the retina.

Accordingly, in some embodiments of the present invention, as illustrated in a self-explanatory manner in FIG. 1D, the beam combiner M is configured as a one-way reflective wedge deflector with its front and rear surfaces, SM and SG are not parallel but tilted with respect to one another, so that the ghost reflection GHS from the less/non reflective surface SG thereof propagates in a direction outside the global optical path GOP and does not continue to propagate to the user's eye 10, while the main reflection MF propagates along the global optical path GOP.

Indeed, such implementation of the beam combiner M may be used in any of the above described embodiments of FIGS. 4A to 4C and 4E. The tilt angle θ between the front and rear surfaces, SM and SG, should be configured large enough (e.g. typically with angle of at least 3 degrees) to remove the ghost reflections from the global optical path GOP, namely large enough such that projected light from one of the first and second image projection units is reflected from one of said surfaces of the wedge deflector to propagate along the optical path, while being reflected from another one of said surfaces of the wedge deflector towards a direction outside the optical path to thereby suppress ghost reflections from propagating along the global optical path GOP.

It should however be understood that although the wedge type beam combiner M may be used to suppress ghost reflections, this configuration may not be practical in all implementations of the system 100. For example, the use of such a wedge type beam combiner M may be less suitable when compact and/or light-weight implementations of the system 100 are desired; particularly it is less suited in cases where the implementation is based on the embodiments of FIGS. 4B and 4C in which the beam combiner is located further downstream of the optical path(s) of the system 100, integrated with the optical relay 126 and/or after/downstream therefrom. This is because as the further downstream the beam combiner M is located, the larger it should be (since generally the lateral extent of the image projection expands and gets larger as is propagates downstream the optical path). Therefore, due to the relatively large tilt angle θ required, implementing the wedge type beam combiner M in the embodiments of FIGS. 4B and 4C may result in a large, thick, and/or heavy beam combiner M less suited for compact/lightweight implementations of the system 100.

However, in the embodiment of FIG. 4E, where the first and second image portions are combined upstream from, and outside of, the optical relay 126 (namely the optical relay 126 (at which the lateral extent of the image projection (s) typically significantly expand) is arranged downstream from the beam combiner M of the spatial optical multiplexing module 125.1. Accordingly, since in this case the projections of the first and second image portions have relatively narrow waists when they meet/intersect the beam combiner M, the beam combiner may be a relatively small/narrow and therefore a small wedge deflector beam combiner can be used to suppress ghost reflections, even in scenarios where a compact/lightweight system is sought. Therefore, for some compact/lightweight implementations of the system 100, the implementation of FIG. 4E may be preferable, specifically with respect to suppression of ghost reflection.

Moreover, it should be noted that in the implementation of FIG. 4C in which the spatial optical multiplexing module 125.1 is integrated with the optical relay 126, the first and second image portions are combined within the optical relay 126; i.e. between its exit lens-set L2 and its entrance (first) lens-sets L1a and L1b. This however requires that the optical relay 126 is configured as a tele-centric optical relay module. In this connection the phrases telecentric and/or telecentric optical system/module should be understood as in their conventional meaning in the art.

However, the telentricity for the optical relay 126 of FIG. 4C requires that a much more complex optical lens-sets (e.g. L1a, L1b and/or L2) including one or more additional optical elements/lenses as compared to optical relays 126 of FIGS. 4B and 4E, in which telentricity requirement is relaxed/not-needed, and/or resulting in higher aberrations (e.g. increased spherical and/or chromatic aberrations). To this end, although for some purposes the embodiment of FIG. 4C may be superior, for other purposes it may be less suited since it requires a more complex optical system (more elements) which may be costly, less compact and/or heavier.

Thus, in terms of the optical relay complexity, cost, size, weight, optical aberrations, and/or their combination, the embodiments of FIGS. 4B and 4E may provide superior results, particularly with respect to consumer commercial products with system 100. Nonetheless, it should be understood that for some professional implementations of system 100, the embodiment of FIG. 4C may be preferable.

It should be noted that schematically, in FIGS. 4B, 4C and 4E, the optical relay 126 is illustrated as a refractive and/or diffractive relay in which the first (entrance/input) lens-set (L1, L1a, L1b) and the second (exit/output) lens-set (L2, L2a, L2b) are implemented as refractive (e.g. and/or possibly diffractive lens-sets) each including at least one refractive (and/or diffractive) lens. Indeed, in typical cases where no-net optical power is required from the optical relay, the first and second (exit/output) lens-set (L2, L2a, L2b) is arranged along an optical paths (OP1, OP2 and/or GOP), with an optical distance between the principal optical planes of each pair of the entrance and exit lens-sets along the optical path matching the sum of the focal lengths of the pair.

However, it should be understood that the optical relay 126 of the system 100 may not necessarily be implemented as a refractive and/or diffractive optical relay. Indeed, in some embodiments of the present invention the optical relay may be implemented as a reflective optical relay in which at least one of the entrance and exist lens-sets includes at least one mirror lens (e.g. curved reflective surface having the desired focal lengths).

The use of an optical relay 126 of a reflective type may be advantageous in terms of any one of the following:
(i) Reduced chromatic aberrations with the use of even a single optical element in each lens-set (since reflective surfaces generally introduce no chromatic aberrations);
(ii) Reduced weight, since the reflective surfaces may be lighter in weight as compared to refractive/diffractive lenses.
(iii) Simplified and more cost effective manufacturing of the reflective surfaces of the first and second lens-sets. The first and second lens-sets may be fabricated together on the same substrate/plane as shown for example in FIG. 4F.
(iv) Compact size of the optical relay 126, by utilizing for example the folded optical relay configuration as shown for example in FIG. 4F.

Figure 4F:
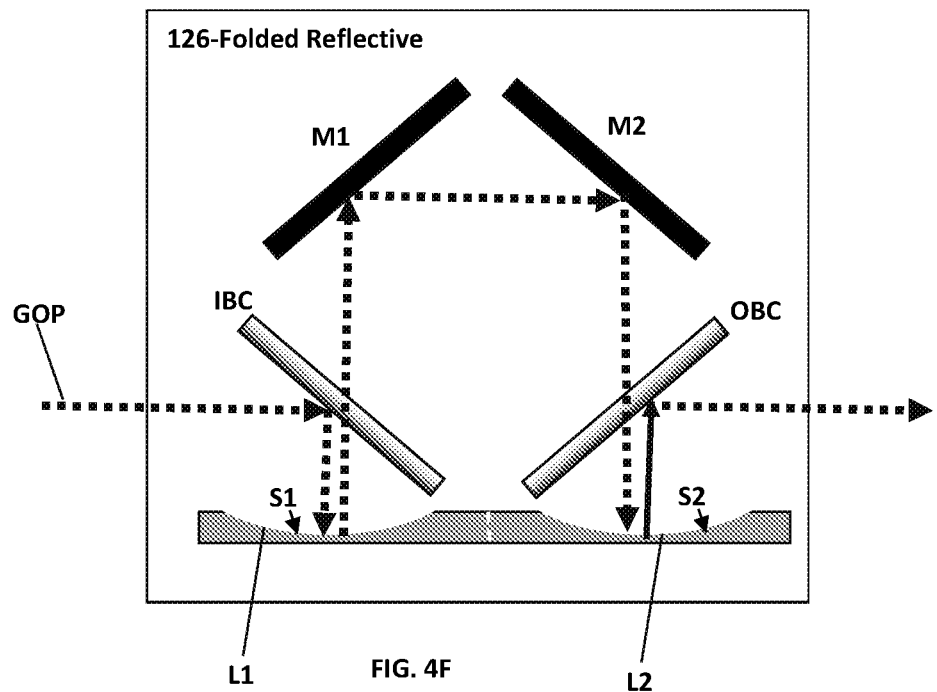

FIG. 4F exemplifies an optical relay 126 of a reflective type, which can be used in the system 100 of the present invention (e.g. instead of the refractive and/or diffractive optical relays illustrated in FIGS. 4B, 4C, and 4E). The optical relay 126 is a reflective relay including at least the first (entrance) lens-set L1 and the second (exit) lens-set L2 implemented respectively by/with first and second curved reflective/mirror surfaces S1 and S2 which have respective optical powers (optical lengths f1 and f2). As illustrated, the optical relay may optionally include one or more deflectors (mirrors), e.g. M1 and/or M2, and possibly one or more beam combiners (e.g. IBC and OBC being in this example entrance/input and exit/output beam combiners) arranged to define the optical path GOP through the optical relay.

In embodiments in which the optical relay should have no net optical power, the optional one or more deflectors (mirrors) and/or beam-combiners, e.g. M1 and/or M2 and/or IBC and/or OBC and/or the reflective/mirror surfaces S1 and S2 of the lens-sets, are arranged such that optical distance between surfaces S1 and S2 matches a sum of their focal lengths (f1+f2) as in the case of refractive/diffractive relay. Likewise, the optical magnification ratio of the relay is provided by the ratio of f1/f2.

In the particular example of FIG. 4F, the reflective optical relay 126 is configured as a folded reflective optical relay, and is characterized in that a physical distance between the first and second reflective surfaces S1 and S2 of lens-sets L1 and L2 is smaller than an optical distance between them along the optical path GOP through the relay. This is achieved by the arrangement of the mirrors and/or beam combiners in the optical relay. Such an arrangement provides a compact, lightweight and cost-effective optical relay configuration, having reduced chromatic aberrations.

Moreover, in the particular example of FIG. 4F, the reflective surfaces S1 and S2 are arranged on a common plane, such that they can be fabricated on the same substrate. This provides for reduced production costs and more simplified mass production since in this case the same procedure may produce the surfaces S1 and S2 together on the same plane while without requiring any respective alignment of the surfaces with respect to one another after production.

In this example where the first and second reflective surfaces S1 and S2 are arranged along a common plane, the set of deflective surfaces defining the optical path between them includes the first and second beam splitters/combiners IBC and OBC located along the optical path respectively upstream from the first reflective surface S1 and downstream from the second reflective surface S2 to respectively define input and output optical ports of the relay 126, and one or more deflectors, e.g. M1 and M2, arranged to define the optical path GOP with desired optical distance between the first and second reflective surfaces S1 and S2.

Figure 4G:
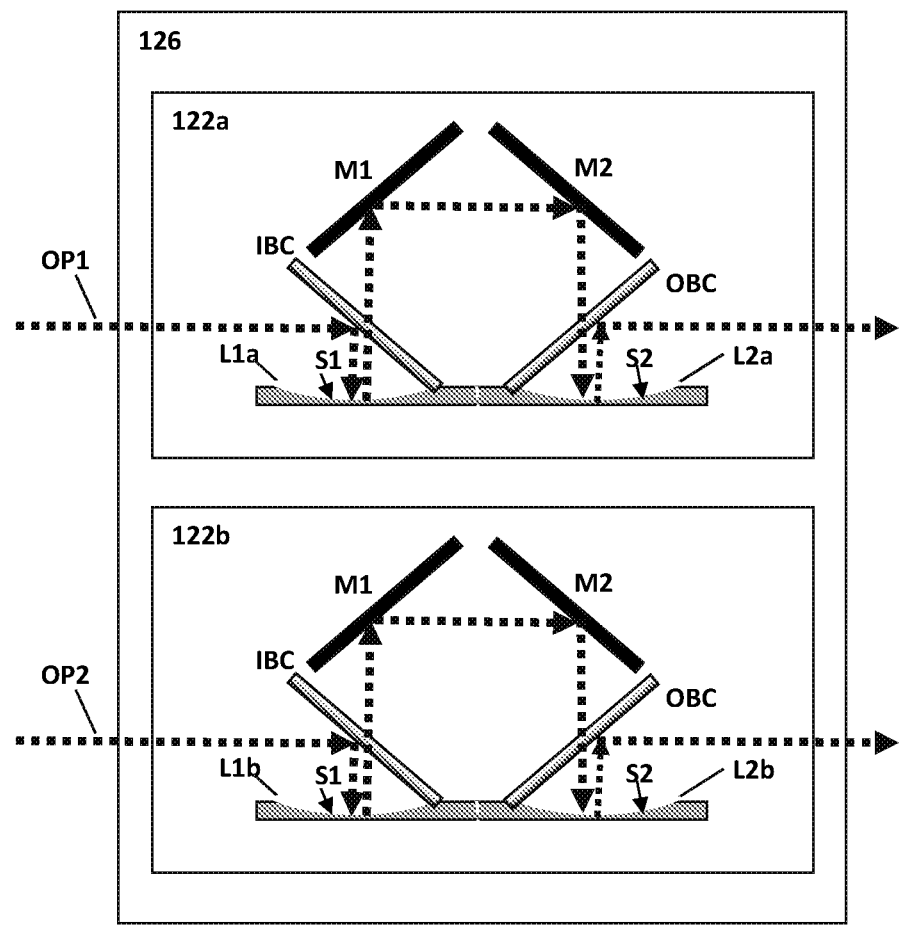

It should be noted that the reflective type optical relay 126 of FIG. 4F is designed to fit the embodiment of FIG. 4E for using a reflective type optical relay instead of the refractive or diffractive type relay illustrated there. FIG. 4G exemplifies, in a self-explanatory manner, a reflective type optical relay designed to match the embodiments of FIG. 4B. In the relay of FIG. 4G the relay 126 includes two separate relays 122a and 122b which are configured somewhat similarly as the relay illustrated in FIG. 4F, whereby each of the relays 122a and 122b operates on a different one of the first and second image options respectively propagating along the optical paths OP1 and OP2. The first and second image portions are combined after the relay126 as illustrated in FIG. 4B. Although not specifically illustrated, it should be understood, and will readily be appreciated by those versed in the art knowing the present invention, that a reflective type relay can be also designed for the system 100 of the embodiment of FIG. 4C in which the beam combiner M, that combines the optical paths OP1 and OP2 to the common path GOP, is located within and integrated with the optical relay 126.

It should be understood than in various implementations of the system, also a combination of refractive diffractive and or reflective optical elements may be included in the optical relay 126. In case diffractive elements are used, such elements should be preferably tuned to provide similar optical powers (optical lengths) for at least the discrete number of wavelengths emitted by the projection module 11 (e.g. by laser or LED illumination modules thereof). These typically include at least three particular and discrete wavelengths: R, G, and B (red, green and blue). Such multicolor diffractive elements are readily known in the art.

As indicated above, FIGS. 4A to 4G exemplify several non-limiting examples/embodiments of the technique of the present invention utilizing spatial multiplexing for projecting composite/combined images on a retina of a user's eye, whereby each combined/composite image projection includes: a first portion of the image which is arranged in the combined projected image, such that when the combined image is projected on the retina, the first portion is projected on the foveal region of the retina with higher spatial resolution (higher DPI) and/or possibly with lower frame rate, and the second portion of the projected image is projected on the peripheral region of the retina with lower spatial resolution (lower DPI) and/or higher frame rates. In these embodiments two (or more) image projection units 130 and 140 are used to project the first and second image portions along respective optical paths OP1 and OP2, and spatial optical multiplexing module is used to combine the projection paths OP1 and OP2 of the first and second image portions to form a composite image propagating along the common global optical path GOP of the system, such that the first image portion is projected across a certain middle/center region of the lateral cross-section of the combined image projection and/or such that the second image portion is projected with larger lateral extent than the first image portion, and is arranged in lateral cross-section of the combined image projection such that it frames/surrounds/extends beyond the lateral extent of the projection of the first image projection. It should be understood that the first and second image portions may or may not be projected simultaneously by the first and second projection units (e.g. depending on whether the projection units operate in the same frame rate and/or with synchronization with one another or not). It should also be understood that the first and second image portions may be parts of one video frame of a video that should be projected to the eye and that the system 100 (e.g. the control unit) may be adapted to project the video by the consecutive projection of the sequence of video frames included therein each as combined/composite image as discussed above (i.e. each or at least some of the video frames are divided to their respective foveal (first) and parafoveal/peripheral (second) regions, and are projected by the respective image projection unit.

Reference is now made to FIGS. 5A and 5B illustrating the system 100 according to two embodiments of the present invention in which an optical multiplexer being a temporal optical multiplexer 125.2 is used for projection of the first and second image portions of each image frame which should be projected to the respective foveal and parafoveal regions of the eye retina. In these embodiments, the image projection module 11 may include only a single image projection unit 130, which may be configured and operable for projecting a temporal sequence of the first and second image portions, each image portion at a time. The system includes only a single/global optical path GOP along which the first and second image portions are sequentially projected. Generally, the first and second image portions may be projected with the similar angular extent $\alpha_{max}$ of the single image projection unit 130, or possibly with somewhat different angular extents, along the global optical path GOP downstream from the single image projection unit 130 (with respect to direction of light propagation). The optical module 120 includes an optical multiplexing module including an adaptive magnification optical relay module 126 configured with adjustable magnification ratio located downstream from the single image projection unit with respect to direction of light propagation from said single image projection unit. The adaptive magnification optical relay 260 includes a temporal multiplexer module which is operable for temporally multiplexing the first and second image portions with different magnifications yielding different respective angular extents $\alpha^1_{in}$ and $\alpha^2_{in}$ for the respective projections of first and second image portions when they reach the pupil of the eye 10.

To this end, the (single) image projection unit 130 is configured and operable for projection images at a certain total frame rate (TFR) that is equal or greater than the frame rates FR1 and FR2 at which the first and second image portions should be projected on the retina to be captured smoothly (without flickering sensation) on their respective foveal and parafoveal regions on the retina. For instance, the frame rate FR1 for projecting the first image portion on the foveal should generally be at least 25 frames per second (FPS) where typically at least 30 FPS is preferable, and the frame rate FR2 for projecting the second image portion on the parafoveal regions should be at least 60 FPS whereby typically at least 90 FPS is preferable. The control unit 200 operates the single projection unit 130 for projecting the sequence of frames including the first image portions projected at a first fraction FR1 of the total frame rate TFR and the second image portions projected at a second fraction FR2 of the total frame rate.

The adaptive magnification optical relay 260 used in these embodiments of the present invention introduces controllably variable magnification to the image projections of the first and second image portions along the optical path GOP. The adaptive magnification optical relay 260 is configured and operable and can be operated temporally sequentially for changing its magnification ratio at minimal rate MVR (hereinafter referred to also as magnification variation rate) that equals to at least the lowest one of the frame rates FR1 and FR2 of the projections of the respective first and second image portions MVR≥Min{FR1,FR2}, typically MVR≥FR1 since typically FR1>FR2. Accordingly, the magnification variation rate of the adaptive magnification optical relay MVR typically matches at least 25 FPS.

The control unit is configured and operable for operating the adaptive magnification optical relay module 126 and the single image projection unit 130 is in time synchronization between them, such that the timings of projections of the first and second image portions by the single image projection unit 130 is synchronized for the first and second magnification ratios provided by the optical relay. Accordingly, different first and second magnification ratios are affected to respective projections of the first and second image portions. This thereby outputs from the relay 126 a time multiplexed combined projection of the first and second image portions, with the second image portion having larger angular extent than said first image portion.

Turning now more specifically to the embodiment of FIG. 5B, the adaptive magnification optical relay module 126 includes at least first and second groups of lenses/lens-sets GP1 and GP2 arranged along the optical path GOP. Generally, at least one of the first and second groups of lenses is an adaptive group GP1 and GP2 having its focal length f and location of its effective principal optical plane adjustable in between at least two states (e.g. in this case for focal lengths of group GP1 may change in between $f=f_{11}$ and $f=f_{12}$ while its respective effective principal plane changes correspondingly in between planes $PP_{11}$ and $PP_{12}$). The second group may have for example a fixed focal length $f_2$ or possibly also has a variable focal length in case it is also adaptive. To this end, when changing the adaptive group (in this example GP1) in between its two focal states $f_{11}$ and $f_{12}$ the adaptive magnification optical relay 126 provides different respective magnification M1 and M2 being the ratios of the focal lengths of GP1 and GP2 in the two stats as follows: $M1=f_{11}/f_2$ and $M2=f_{12}/f_2$.

As illustrated in the present example, in some embodiments where the relay 126 should have not optical power, the first and second groups, GP1 and GP2, are arranged such that at each magnification state of the relay, the optical distance between the effective principal optical planes of the groups GP1 and GP2 equals the sum of their focal lengths at the respective magnification state. As shown in the figure, the distance between the principal optical plane $PP_2$ of the second group GP2 and the principal optical plane $PP_{11}$ of the first group in the first magnification state equals the sum of the focal lengths of the first and second groups at this state $f_{11}+f_2$, so no net optical power is provided by the relay at this state. Accordingly, in the second magnification state the optical distance between the effective principal optical planes $PP_{11}$ and $PP_2$ of the respective groups GP1 and GP2 equals the sum of their focal lengths $f_{12}+f_2$ at the second magnification state.

In this regard, it should be understood that in implementations where certain optical power should be provided by the relay 126, the distance between the groups or their optical elements may be adjusted differently.

It should be noted that each adaptive group (only GP1 in this case) generally provides the function of a zoom lens-set which also provides variable magnification. However, conventional mechanical zoom lenses cannot generally be actuated in between the different magnification states at the required magnification variation rate MVR of the adaptive magnification optical relay which should typically be at least 25 FPS.

To this end, according to certain embodiments of the present invention the optical relay is configured and operable for electronically controlled variation of the magnification with no need for mechanical movement or moving parts required for changing the magnification.

To this end, according to some embodiments of the present invention the adaptive group (GP1 in this example) includes a plurality of at least two (first and second) adaptive lenses/lens-sets (in the present example L1a and L1b) each having its respective effective focal length switchable between several operational modes (in the present example the focal length of L1a is switchable between $f_{11}$ and infinity and the focal length of L1b is switchable between $f_{12}$ and infinity). Typically each of the adaptive lenses/lens-sets is arranged such that its respective effective principal optical plane is at a different location along the optical path GOP. The second group GP2 may be adaptive or not (may include adaptive lenses or fixed focal lenses) and may be arranged at respective distances from the adaptive lenses of the first group in the manner described above to yield the optical relay 126 with or without focal power as desired in the particular implementation of the system 100. To this end the adaptive optical relay of this example may provide a discrete number of different magnifications states depending on the number of adaptive lenses each of the adaptive groups of lenses (e.g. GP1) includes and the number of focal modes to which each adaptive lens can be set.

It should be noted that the adaptive lenses included in the system may be of any suitable type. In the present example, each one of the first and second adaptive lens sets, L1a and L1b, includes at least one tunable liquid crystal diffractive lens operable/tunable in between the above indicated two focal modes. However, it should be understood and will readily be appreciated by those versed in the art that other types of tunable lenses may also be used in the system of the invention.

In some embodiments each adaptive lens may acquire several operational modes of its focal length state. In the present example, each of the adaptive lens-sets, L1a and L1b, is configured with two operational modes:

(i) LENS-OFF operational mode provides an infinite focal length of the adaptive lens-set; and (ii) LENS-ON operational mode providing a finite focal length, whereby for the first adaptive lens-set the finite focal length is f11 being referred to herein as the first focal length, and in the second adaptive lens-set the finite focal length is $f_{12}$ being referred to herein as the second focal length.

The adaptive magnification optical relay of the present example is configured to operate in one of two magnifications states M1 and M2, in each of which a different combination of the LENS-ON and LENS-OFF operational modes are applied to the different adaptive lens-sets. More specifically in the present example first magnification ratio M1 applied to the first image portions to obtain the pupil entrance angle $\alpha^1_{in}$ is obtained by turning adaptive lens-set L1a on (LENS-ON mode) and turning and adaptive lens-set L1b off (LENS-OFF mode), and the second magnification ratio M2, applied to the second image portions to obtain the pupil entrance angle $\alpha^2_{in}$ is obtained by turning adaptive lens-set L1a off and turning and adaptive lens-set L1b on.

In some embodiments, the adaptive group is configured such that optical distances between the different locations of the effective principal optical plane of the adaptive group in the two magnification states matches a difference between the effective focal lengths of the adaptive group in the two states. Accordingly, the similar focal length of the optical relay (be it infinite (no focal power) or finite focal length (with certain focusing power)) is obtained by the relay in the two states.

In some embodiments, each one of the first and second adaptive lens-sets, L1a and L1b, includes at least one tunable liquid crystal diffractive lens. The image projection unit 130 is configured to project the sequence of frames/images/image-portions by utilizing light in at least three monochromatic primary colors (e.g. R, G, and B). To this end the tunable liquid crystal diffractive lenses used in the system are each configured and operable to have the same optical power with respect to the at least three monochromatic primary colors used/projected by the image projection unit 130. This provides for suppressing chromatic aberrations. In this regard, as will be appreciated by those versed in the art, certain adaptive diffractive lenses already developed are configured and operable to provide the similar focal power to several wavelengths. Such lenses can be readily configured for operation with no chromatic aberration, particularly in some embodiments of the present invention in which the image projection unit 130 utilizes monochromatic light (e.g. laser light) in the respective specific discrete wavelengths of the required three or more primary colors.

As indicated above, the system 100 includes, or is associated with, projection controller (control unit) 200 which is configured and operable for receiving data indicative of said first and second image portions to be respectively projected onto the foveal and peripheral rations of the retina. In this embodiment, the controller 200 is configured and operable to:

(i) operate the single image projection unit 130 for projecting the first image portion with a first frame rate being of at least 25 FPS in order to exceed the perception rate of the fovea; and operating the adaptive magnification optical relay module in synchronization with projections of the first image portions so as to affect a first magnification ratio M1 to the projections of the first image portions whereby the first magnification ratio M1 is adapted to project the first image portions on the foveal region of the retina; and (ii) operate the single image projection unit for projecting the second image portion with said second frame rate being of at least 60 FPS in order to exceed the perception rate of the peripheral regions of the retina; and operating the adaptive magnification optical relay module in synchronization with projections of the second image portions so as to affect a second magnification ratio M2 to the projections of the second image portions. The second magnification ratio is larger than the first magnification ratio, such that the second image portions cover said peripheral regions of the retina.

Generally, according to the present invention as described herein with reference to FIGS. 1, 4A-4F and 5A and 5B, the single projecting unit 130 and/or the first and second projecting unit, 130 and 140 may be any type of projecting unit, and may preferably be configured as scanning laser projecting units. Generally, projection units of scanning laser type may provide greater efficiency with respect to light intensity, as well as better resolution of the projected images. Typically, the first/single and/or the second projecting units, 130 and/or 140, may be configured with similar specification, while providing projection of different image data sent for the control unit (200 in FIG. 1) or Graphic Processing Unit (GPU) thereof. Although the optical module 120 is configured to temporally or spatially combine the first and/or second image portions projected by the first and/or second projecting units (130 and/or 140) as generally exemplified in FIG. 3, the image data of the second image portions may be indicative of the complete image including the central (foveal) region, or it may include image data corresponding to a donut shaped image (i.e. peripheral image having a hole region, where the image projected by the first projection unit 130 is combined).

As indicated above, the first/single image projecting units 130 may preferably be scanning laser type projection units. In such projection units, a raster light deflector (moving mirror, e.g. utilizing MEMS) is configured to scan a laser beam within an angular scanning range (angular projection range) $\alpha_{max}$.

The optical module 120 combines and directs the light of the at least first and second projecting units such that at the user's pupil, light generated from the first image portions has angular range $\alpha^1_{in}$ when entering the eye and light from the first image portions has angular range $\alpha^2_{in}$ larger than $\alpha^1_{in}$ when entering the eye. Effectively, different angles of light propagation at the user's pupil correspond to different points within the field of view. This is because angular resolution of light projection generally corresponds to resolution of the perceived image. The inventors have found that based on the anatomy of the human eye, input angular range of light projection by the first projection unit $\alpha^1_{in}$ is preferably configured to be within a range of about 3°. In some configurations, the optical module 120 and the relay module 126 thereof are configured to provide an angular range of about $\alpha^1_{in}=5°$ to ensure coverage of the foveal region within the retina. The angular range $\alpha^1_{in}$ is preferably determined in accordance with image resolution provided by the first projection unit 130 such that angular resolution at the input pupil of the user exceeds 2 arcminutes per pixel, and preferably exceeds 1 arcminute per pixel. The second image portions are generally projected to provide meaningful images within the periphery of the field of view. Thus, the angular range $\alpha^2_{in}$ associated with image projection by the second projecting unit 140 is preferably greater than 20°, and in some configurations may be greater than 70° to provide the user image projection with a wide field of view and provide a sense of presence within the projected image. The first and second image portions may include a similar number of pixels (similar number of different angular points/rays), such that due to the smaller angular range of the projection of first image portion, a higher angular/spatial resolution is provided thereby on the foveal region of the retina.

When scanning laser type projection units are used, the laser beam may generally include light beams from three or more laser units emitting three or more primary colors (e.g. red, green and blue) and is configured to vary intensity of each of the colors in accordance with the scanning orientation to provide imaging of desired image data. The optical module 120 is configured to relay the light output from the first and second projection units such as to direct the projected light onto the user's eye. Generally the optical unit, and more specifically, the relay module 126 thereof is configured to direct the input light into the user's eye such that a cross section of the light, at the user's pupil (i.e.

eye-box) has a diameter smaller with respect to the user's pupil. More specifically, the cross section diameter of light (e.g. full width, half max measure, or standard deviation measure) is smaller with respect to pupil diameter in strong lighting conditions. This is because the trajectory module 124 deflects the general optical path to vary location and angle of the eye-box (exit pupil of the system) in accordance with detected gaze direction (LOS) and/or location of the pupil (e.g. due to eye/LOS movement relative to the eye projection system 100). It should also be noted that output intensity of the projecting units, being scanning laser based on non-laser or non-scanning, and in some embodiments being spatial light modulator image projecting units (e.g. LCD based), is preferably sufficiently low, or is attenuated, to avoid damage and preferably avoid discomfort to the user.

In this connection it should be noted that the direct projection technique used by the optical module 120 according to the present invention provides for projecting images onto the eye retina, in a manner that the input light field propagates to an image plane on the retina. This is generally achieved regardless of focusing distance/configuration of the user's eye (which is generally controlled based on real or virtual distance to objects of interest) as the eye-box size, or cross section of the light field at the pupil, is generally smaller than pupil diameter. This provides image projection with enhanced depth of focus on the retina. Accordingly, the image is projected to be substantially focused on the retina, at substantially any focal state of the eye lens. For example, the image may be projected with substantial depth of focus allowing it to remain focused on the retina, while the eye lens is at any focal state within a wide focal length range from 4 meters to ∞.

Generally, according to some embodiments of the present invention, the eye projection system as exemplified in FIGS. 4A to 5B, utilizes optical relay of the projected images into the user's eyes. In this connection, the technique of the present invention temporally and/or spatially combines the projected images of the projection units (e.g. first and second projection units), and the combined light field passes through the trajectory module 124, tracking eye's movements, and are transmitted to the eye through relay module 126. Thus, the optical module 120 may be configured to optimize projection with respect to eyes' orientation, illumination conditions, image characteristics, user preferences etc. This is because the different first and second image portion projections are combined to direct image portions to the corresponding regions in the user's retina. The projected image portions are combined using the one or more spatial/temporal optical multiplexers (e.g. beam combiners and/or adaptive lenses) which may be integrated with or located upstream or downstream from an optical relay module. The latter is typically also configured to adjust spreading of the projected images such that the pixel density in the "foveal" image projected by the first projection unit is greater with respect to the pixel density in the surrounding "retinal" image projected by the second projection unit. Generally, the foveal image is projected with resolution corresponding to 480p 720p, 1080p or higher onto an angular portion of the field of view of about 3° to 5° to each direction. The parafoveal/retinal image is projected with a substantially similar number of pixels; however the projected image is relayed to the user's eye such that it takes a predetermined part of the user's field of view, while leaving the central region, corresponding to the foveal image as shown in FIG. 3, with low projection intensity to thereby allow projection of the foveal image by the first projecting unit 130.

Figure 6:
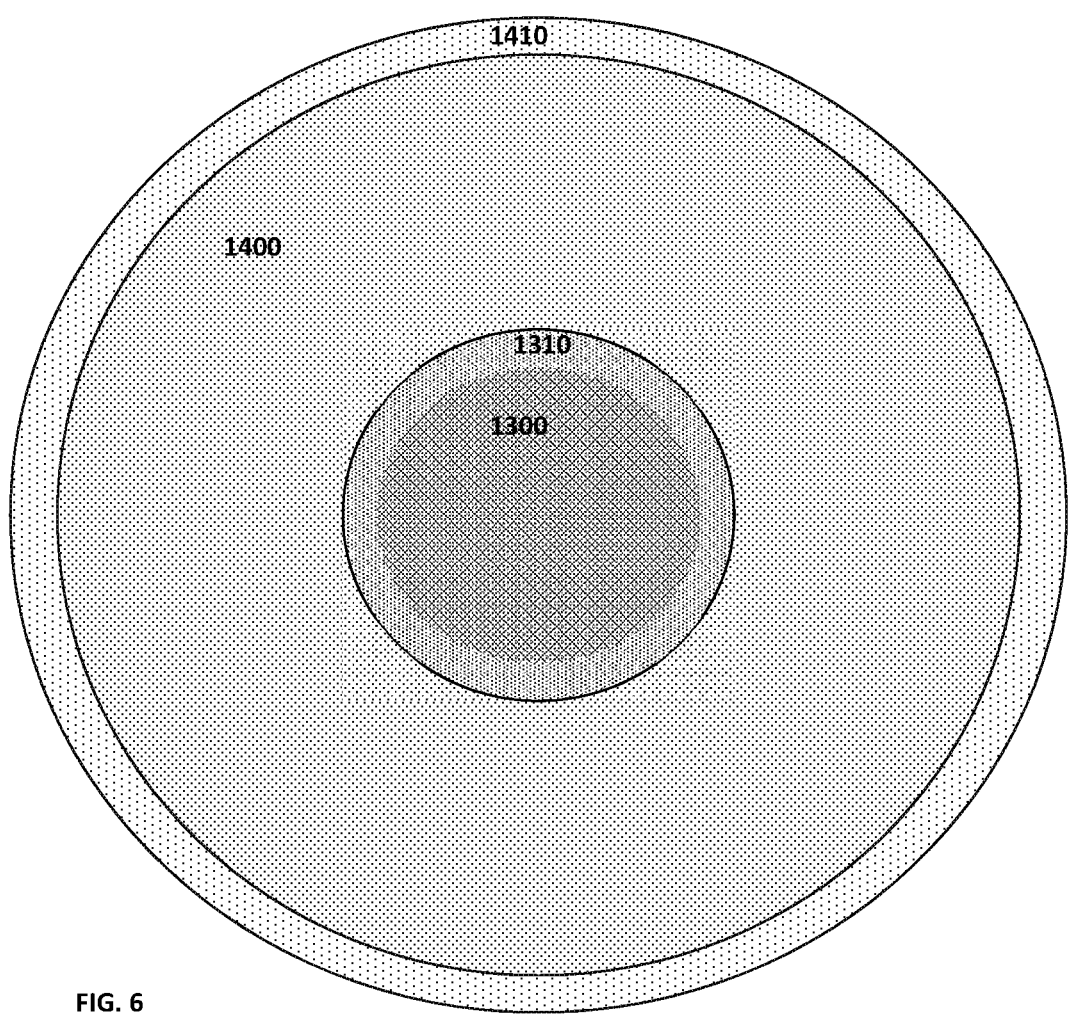
FIG. 6 illustrates some image rendering concepts used in the eye projection system according to some embodiments of the present invention.

Thus configuration of the optical module allows for adjustments of the exit pupil and of the general optical path in accordance with eye tracking and image characteristics. It should also be noted that by providing high resolution images directed at the fovea with lower resolution peripheral image data, the system may optimize the experience while reducing computation complexity. Further, in order to compensate for small eye movement, the Graphic Processing Unit (GPU) associated with the eye projection system, may be configured to render image data corresponding to a region that is slightly greater than the actual image data projected. Thus, the rendered image data exists and may be directly transmitted to the projection units based on the exact location of the eye at the time of projection. This is exemplified in FIG. 6 showing a rendered region of the foveal 1300 and retinal 1400 images. More specifically, while image data corresponding to regions 1300 and 1400 is projected into the user's eyes, the GPU processes image data which corresponds to the following frame. The GPU generated image data corresponds to regions 1310 and 1410, which are larger than regions 1300 and 1400. Regions 1310 and 1410 include image data that is generally outside of the field of view defined by image portions 1300 and 1400, referred to herein as shoulder image data. When, in the newly processed image, data is transmitted to the projection units (130 and 140), the control unit (200) indicates, using eye tracking technology, the exact location of the user's pupil, and the corresponding parts of the processed images are projected. This technique enables image variation compensating for small eye movements by providing already rendered shoulder image data pieces. In this connection, providing high resolution (i.e. below 4 arc-minute$^2$ of solid angle per pixel) to the foveal region of the user's eye in uniform resolution projection, requires generating image data having an extremely large amount of pixels (full hemisphere image with such spatial resolution requires almost 30 Mega pixels). The technique of the present invention allows for providing image projection with desirably high perceived angular resolution, while reducing the image resolution to regions of the eye that are less sensitive. Thus the foveal image utilizes high pixel density providing angular resolution of below 4 arcminutes per pixel, while the parafoveal image provides lower angular resolution (e.g. about 10 arcminutes per pixel). This allows the control unit and the GPU thereof to generate image data corresponding to lower resolution images, e.g. about 5Mega pixels for foveal images and 5Mega pixels for parafoveal images, providing a total rendered image data of about 10 Mega pixels.

Thus the present invention provides a system for image projection to a user's eye. The system is configured to reduce image rendering complexity and data transfer from a processing/rendering unit to the projection unit(s), while providing desirably high resolution images to the user. The system is generally configured to generate combined image projection based on two or more image portions directed at corresponding portions of the user's retina, and is configured to optimally exploit local sensitivity of the different regions of the retina. Those skilled in the art will readily appreciate that various modifications and changes can be applied to the embodiments of the invention as hereinbefore described without departing from its scope defined in and by the appended claims.

The invention claimed is:

1. A system for use in retinal image projection, the system comprising:
   an image projection module adapted for projecting at least first and second image portions corresponding respectively to first and second parts of an image to be respectively projected on foveal and peripheral regions of an eye retina; and an optical multiplexing module optically coupled to the image projection module and configured and operable to combine projections of said at least first and second image portions for generating a combined projection output for propagation along a general common optical path which is to be directed towards said eye retina; and said optical multiplexing module being configured and operable to combine projections of said first and second image portions in at least one of spatial and temporal multiplexing such that a lateral extent of the combined projection is similar to a lateral extent of said second image portion in the combined projection, and the lateral extent of said first image portion in the combined projection being smaller and within the lateral extent of the combined projection;

thereby enabling that upon directing said combined projection towards the eye retina, the projection of said first image portion covers a foveal region of the retina and the projection of said second image portion covers at least a peripheral region of the retina;

wherein said image projection module comprises at least first and second image projection units configured and operable for spatially separated projection of said at least first and second image portions, said image projection module being configured to project the second image portion with an angular extent larger than an angular extent of the first image portion projected by the first image projection unit; and wherein said optical multiplexing module is configured and operable to spatially combine said at least first and second image portions such that the first image portion, projected by the first image projection unit, is at a central region of the combined projection, and the second image portion, projected by the second image projection unit, extends laterally over an annular region enclosing said central region of the combined projection, said optical multiplexing module comprising a beam combiner configured and operable to receive the projections of said first and second image portions having respectively smaller and larger angular extents and combining them to output said combined projection;

the system being characterized by at least one of the following configurations:

(1) said beam combiner comprises a one way reflective wedge deflector having its front and back surfaces tilted with respect to one another with tilt angle selected such that projected light from one of said first and second image projection units is being reflected from one of said surfaces of the wedge deflector to propagate along the optical path while being reflected from another one of said surfaces of the wedge deflector towards a direction outside the optical path to thereby suppress ghost reflections from propagating along the optical path; or (2) said optical multiplexing module comprises an optical relay module arranged downstream from said beam combiner with respect to direction of light propagation from said image projection module; whereby said optical relay is configured and operable for relaying said combined projection towards an optical output of the system.

2. A system for use in retinal image projection, the system comprising:

an image projection module adapted for projecting at least first and second image portions corresponding respectively to first and second parts of an image to be respectively projected on foveal and peripheral regions of an eye retina; an optical multiplexing module optically coupled to the image projection module and configured and operable to combine projections of said at least first and second image portions for generating a combined projection output for propagation along a general common optical path which is to be directed towards said eye retina; said optical multiplexing module being configured and operable to combine projections of said first and second image portions in at least one of spatial and temporal multiplexing such that a lateral extent of the combined projection is similar to a lateral extent of said second image portion in the combined projection, and the lateral extent of said first image portion in the combined projection being smaller and within the lateral extent of the combined projection; thereby enabling that upon directing said combined projection towards the eye retina, the projection of said first image portion covers a foveal region of the retina and the projection of said second image portion covers at least a peripheral region of the retina;

wherein said image projection module comprises at least first and second image projection units configured and operable for spatially separated projection of said at least first and second image portions, said image projection module being configured to project the second image portion with an angular extent larger than an angular extent of the first image portion projected by the first image projection unit; and wherein said optical multiplexing module is configured and operable to spatially combine said at least first and second image portions such that the first image portion, projected by the first image projection unit, is at a central region of the combined projection, and the second image portion, projected by the second image projection unit, extends laterally over an annular region enclosing said central region of the combined projection, said optical multiplexing module comprising a beam combiner configured and operable to receive the projections of said first and second image portions having respectively smaller and larger angular extents and combining them to output said combined projection;

wherein said optical relay has one of the following configurations: (a) said optical relay is a refractive and/or diffractive relay comprising at least first and second lens-sets arranged along an optical path with an optical distance between them matching a sum of their focal lengths; each of the first and second lens sets comprises at least one refractive and/or diffractive lens; or (b) said optical relay is a reflective relay comprising at least a first and second reflective surfaces having respective optical powers arranged along an optical path of the relay such that an optical distance between them matches a sum of their focal lengths; said reflective optical relay being associated with reduced chromatic aberrations in the combined projection.

3. A system for use in retinal image projection, the system comprising:

an image projection module adapted for projecting at least first and second image portions corresponding respectively to first and second parts of an image to be respectively projected on foveal and peripheral regions of an eye retina; an optical multiplexing module optically coupled to the image projection module and configured and operable to combine projections of said at least first and second image portions for generating a combined projection output for propagation along a general common optical path which is to be directed towards said eye retina; said optical multiplexing module being configured and operable to combine projections of said first and second image portions in at least one of spatial and temporal multiplexing such that a lateral extent of the combined projection is similar to a lateral extent of said second image portion in the combined projection, and the lateral extent of said first image portion in the combined projection being smaller and within the lateral extent of the combined projection; thereby enabling that upon directing said combined projection towards the eye retina, the projection of said first image portion covers a foveal region of the retina and the projection of said second image portion covers at least a peripheral region of the retina;

wherein said image projection module comprises at least first and second image projection units configured and operable for spatially separated projection of said at least first and second image portions, said image projection module being configured to project the second image portion with an angular extent larger than an angular extent of the first image portion projected by the first image projection unit; and wherein said optical multiplexing module is configured and operable to spatially combine said at least first and second image portions such that the first image portion, projected by the first image projection unit, is at a central region of the combined projection, and the second image portion, projected by the second image projection unit, extends laterally over an annular region enclosing said central region of the combined projection, said optical multiplexing module comprising a beam combiner configured and operable to receive the projections of said first and second image portions having respectively smaller and larger angular extents and combining them to output said combined projection;

wherein said optical relay is a reflective relay comprising at least a first and second reflective surfaces having respective optical powers arranged along an optical path of the relay such that an optical distance between them matches a sum of their focal lengths; said reflective optical relay being associated with reduced chromatic aberrations in the combined projection; said reflective relay being a folded reflective optical relay characterized in that a physical distance between said first and second reflective surfaces is smaller than an optical distance between the first and second reflective surfaces along the optical path of the relay; thereby providing a compact optical relay configuration.

4. The system of claim 3 wherein said reflective relay comprises a set of one or more deflectors arranged to define the optical path within the relay between said first and second reflective surfaces.

5. The system of claim 4 wherein said first and second reflective surfaces are arranged along a common plane and wherein said set of deflective surfaces comprises a first and second beam splitters located along said optical path respectively upstream from said first reflective surface and downstream from said second reflective surface to respectively define input and output optical ports of the relay; and one or more deflectors arranged to define the optical path with said optical distance between said first and second reflective surfaces.

6. A system for use in retinal image projection, the system comprising:
an image projection module adapted for projecting at least first and second image portions corresponding, respectively, to first and second parts of an image to be respectively projected on foveal and peripheral regions of an eye retina; and an optical multiplexing module optically coupled to the image projection module and configured and operable to combine projections of said at least first and second image portions for generating a combined projection output for propagation along a general common optical path which is to be directed towards said eye retina; wherein said image projection module comprises a single image projection unit configured and operable at a certain total frame rate for projecting a sequence of frames comprising said first image portions projected at a first fraction of said total frame rate and said second image portions projected at a second fraction of said total frame rate;

said optical multiplexing module is configured and operable to combine projections of said first and second image portions in at least one of spatial and temporal multiplexing such that with a lateral extent of the combined projection is similar to a lateral extent of said second image portion in the combined projection, and the lateral extent of said first image portion in the combined projection is smaller and within the lateral extent of the combined projection; said optical multiplexing module comprising adaptive magnification optical relay module configured with adjustable magnification ratio located downstream from the single image projection unit with respect to direction of light propagation from said single image projection unit; said adaptive magnification optical relay module being operable in time synchronization with timings of projections of said first and second image portions by the single image projection to affect different first and second magnification ratios to respective projections of said first and second image portions, an output from the relay being a time multiplexed combined projection of said first and second image portions with said second image portion having larger angular extent than said first image portion;

thereby enabling that upon directing said combined projection towards the eye retina, the projection of said first image portion covers a foveal region of the retina and the projection of said second image portion covers at least a peripheral region of the retina.

7. The system of claim 6 wherein said image projection module has at least one of the following configurations:
(i) the image projection module is adapted for projecting the first and second image portions having respectively higher and lower spatial pixel densities in the combined projection thereby optimizing said combined projection to correspond respectively to higher and lower spatial resolutions of foveal and peripheral regions of the retina respectively; or
(ii) the image projection module is adapted for projecting the first and second image portions with respectively lower and higher frame rates in the combined projection thereby optimizing said combined projection to correspond respectively to lower and higher temporal resolutions of foveal and peripheral regions of the retina respectively.

8. The system of claim 6 wherein said adaptive magnification optical relay module comprises at least a first and second group of lenses arranged along the optical path wherein at least one group of the first and second groups of lenses is an adaptive group having its focal length and location of its effective principal optical plane adjustable in between at least two states; and wherein said first and second groups are arranged such that an optical distance between their effective principal optical planes equals a sum of their optical lengths at said two states such that adaptive magnification optical relay provides different magnification ratios in said two states.

9. The system of claim 8 wherein said adaptive group comprises at least a first and second adaptive lens sets arranged such that their respective effective principal optical planes are at different locations along the optical path and having their respective effective focal lengths switchable between several operational modes of each lens.

10. The system of claim 9 wherein said several operational modes of the adaptive lens set include:
(i) LENS-OFF operational mode of each adaptive lens set provides an infinite focal length of the adaptive lens set; and
(ii) LENS-ON operational mode of the adaptive lens set provides that the adaptive lens has a certain finite focal length.

11. The system of claim 10 wherein said first and second groups of lenses comprises said adaptive group and a non-adaptive group having fixed focal length and fixed location of its principal optical plane; and
wherein said two states comprise a first and a second magnification states optical relay in which said first and second adaptive lens sets are set, respectively, to different combinations of said LENS-ON and LENS-OFF operational modes such that, in said first and a second magnification states, said adaptive group has different effective focal lengths and different locations of its effective principal optical plane along the optical path.

12. The system of claim 11 wherein optical distances between said different locations of the effective principal optical plane of the adaptive group in said two states matches a difference between the effective focal lengths of said adaptive group in said two states.

13. The system of claim 11 wherein:
in said first magnification state, said first and second adaptive lens sets are set respectively to LENS-ON and LENS-OFF operational modes to thereby provide a first magnification ratio of said adaptive magnification optical relay, and
in said second magnification state, said first and second adaptive lens sets are set respectively to LENS-OFF and LENS-ON operational modes to thereby provide a second magnification ratio of said adaptive magnification optical relay.

14. The system of claim 9 wherein each one of said first and second adaptive lens sets comprises at least one tunable liquid crystal diffractive lens.

15. The system of claim 14 wherein said single image projection unit projects said sequence of frames utilizing at light in at least three monochromatic primary colors; and wherein said tunable liquid crystal diffractive lens is configured and operable to have the same optical power with respect to said at least three monochromatic primary colors, thereby suppressing chromatic aberrations.

16. The system of claim 6 comprises a projection controller configured and operable for receiving data indicative of said first and second image portions to be respectively projected on the foveal and peripheral rations of the retina, and wherein said controller is configured and operable to:
(i) operate said single image projection unit for projecting said first image portion with said first frame rate being of at least 25 FPS in order to exceed the perception rate of the fovea; and operating said adaptive magnification optical relay module in synchronization with projections of said first image portions so as to affect a first magnification ratio to the projections of the first image portions whereby the first magnification ratio is adapted to project the first image portions on said foveal region of the retina; and
(ii) operate said single image projection unit for projecting said second image portion with said second frame rate being of at least 60 FPS in order to exceed the perception rate of the peripheral regions of the retina; and operating said adaptive magnification optical relay module in synchronization with projections of said second image portions so as to affect a second magnification ratio to the projections of the second image portions whereby the second magnification ratio being larger than said first magnification ration and is adapted to project the second image portions to cover said peripheral regions of the retina.

* * * * *